United States Patent
Nakai et al.

(10) Patent No.: US 9,413,281 B2
(45) Date of Patent: Aug. 9, 2016

(54) APPARATUS FOR CONTROLLING AC MOTOR

(71) Applicant: DENSO CORPORATION, Kariya, Aichi-pref. (JP)

(72) Inventors: Yasuhiro Nakai, Kariya (JP); Takahumi Oowada, Kariya (JP)

(73) Assignee: DENSO CORPORATION, Kariya (JP)

(*) Notice: Subject to any disclaimer, the term of this patent is extended or adjusted under 35 U.S.C. 154(b) by 50 days.

(21) Appl. No.: 14/620,760

(22) Filed: Feb. 12, 2015

(65) Prior Publication Data

US 2015/0229247 A1   Aug. 13, 2015

(30) Foreign Application Priority Data

Feb. 12, 2014   (JP) .................. 2014-024504

(51) Int. Cl.
| | |
|---|---|
| H02P 21/00 | (2016.01) |
| H02P 21/06 | (2016.01) |
| H02P 29/00 | (2016.01) |
| B60L 7/14 | (2006.01) |
| B60L 11/00 | (2006.01) |
| B60L 11/14 | (2006.01) |

(Continued)

(52) U.S. Cl.
CPC . *H02P 21/06* (2013.01); *B60L 7/14* (2013.01); *B60L 11/005* (2013.01); *B60L 11/14* (2013.01); *B60L 15/007* (2013.01); *B60L 15/025* (2013.01); *B60L 15/2009* (2013.01); *H02P 29/0038* (2013.01); *B60L 2210/40* (2013.01); *B60L 2240/12* (2013.01); *B60L 2240/421* (2013.01); *B60L 2240/423* (2013.01); *B60L 2240/427* (2013.01); *B60L 2240/429* (2013.01); *B60L 2240/441* (2013.01); *B60L 2240/443* (2013.01); *B60L 2240/527* (2013.01); *B60L 2240/529* (2013.01)

(58) Field of Classification Search
USPC ...................... 318/400.02, 490, 727
See application file for complete search history.

(56) References Cited

U.S. PATENT DOCUMENTS

| | | | | |
|---|---|---|---|---|
| 5,167,002 A | * | 11/1992 | Fridhandler | .............. H02P 6/06 388/815 |
| 5,514,978 A | * | 5/1996 | Koegl | .................. G01R 31/346 318/346 |

(Continued)

FOREIGN PATENT DOCUMENTS

| | | | | |
|---|---|---|---|---|
| JP | 2001197797 A | * | 7/2001 | |
| JP | 2003180094 A | * | 6/2003 | |

(Continued)

*Primary Examiner* — Eduardo Colon Santana
*Assistant Examiner* — Cortez Cook
(74) *Attorney, Agent, or Firm* — Nixon & Vanderhye PC

(57) ABSTRACT

In an apparatus, a controller performs, as a calculation of d- and q-axis values of a current vector, a first task and a second task. The first task expands one of a measured first phase current and another phase current into Fourier series of the corresponding phase current as a function of an electric rotational angle of an AC motor. The first task extracts a first-order component from the Fourier series to obtain first and second Fourier coefficients of the first-order component. The second task calculates the d-axis value as a first sum of the first and second Fourier coefficients to which temporally-invariant constants of a first pair have been multiplied, and the q-axis value as a second sum of the first and second Fourier coefficients to which temporally-invariant constants of a second pair have been multiplied.

10 Claims, 13 Drawing Sheets

(51) Int. Cl.
 _B60L 15/00_ (2006.01)
 _B60L 15/02_ (2006.01)
 _B60L 15/20_ (2006.01)

(56) References Cited

U.S. PATENT DOCUMENTS

| | | | | |
|---|---|---|---|---|
| 5,574,387 | A | * 11/1996 | Petsche | G01R 31/343 318/806 |
| 6,006,170 | A | * 12/1999 | Marcantonio | G01R 31/343 318/806 |
| 6,293,845 | B1 | * 9/2001 | Clark-Phelps | B24B 37/013 156/345.13 |
| 2008/0079385 | A1 | 4/2008 | Hashimoto et al. | |
| 2009/0251087 | A1 | * 10/2009 | Takei | H02P 29/0038 318/400.23 |
| 2013/0214709 | A1 | 8/2013 | Omata et al. | |
| 2013/0214712 | A1 | 8/2013 | Omata et al. | |
| 2013/0214713 | A1 | 8/2013 | Omata et al. | |
| 2013/0278187 | A1 | 10/2013 | Suzuki et al. | |
| 2014/0152205 | A1 | * 6/2014 | Nakai | H02P 21/05 318/400.02 |

FOREIGN PATENT DOCUMENTS

| | | |
|---|---|---|
| JP | 2004-159391 | 6/2004 |
| JP | 2008-086139 | 4/2008 |
| JP | 2010-057218 | 3/2010 |
| JP | 2013-172592 | 9/2013 |
| JP | 2013-172593 | 9/2013 |
| JP | 2013-172594 | 9/2013 |
| JP | 2013-225991 | 10/2013 |
| JP | 2014-132815 | 7/2014 |

* cited by examiner

FIG.3

| FEEDBACK CONTROL | CURRENT-FEEDBACK CONTROL | | TORQUE-FEEDBACK CONTROL |
|---|---|---|---|
| CONTROL MODE | SINE PWM CONTROL MODE | OVER-MODULATION CONTROL MODE | RECTANGULAR CONTROL MODE |
| OUTPUT-VOLTAGE WAVEFORM OF INVERTER | FUNDAMENTAL COMPONENT | FUNDAMENTAL COMPONENT | FUNDAMENTAL COMPONENT |
| MODULATION FACTOR m | 0~1.27 | | 1.27 |
| CHARACTERISTICS | REDUCE TORQUE VARIATIONS | IMPROVE MOTOR OUTPUT FOR MIDDLE-SPEED RANGE | IMPROVE MOTOR OUTPUT FOR HIGH-SPEED RANGE |

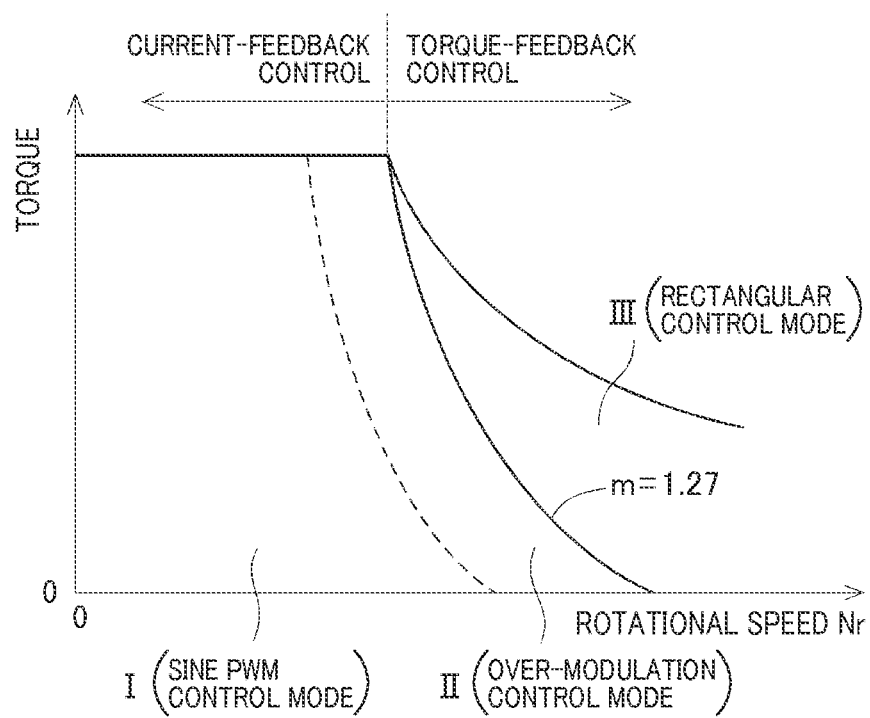

APPARATUS FOR CONTROLLING AC MOTOR

CROSS REFERENCE TO RELATED APPLICATIONS

This application is based on and claims the benefit of priority from Japanese Patent Application 2014-024504 filed on Feb. 12, 2014, the disclosure of which is incorporated in its entirety herein by reference.

TECHNICAL FIELD

The present disclosure relates to apparatuses for controlling an AC motor; the control apparatuses are operative to control electrical driving of the AC motor according to a measured value of each phase current flowing in the AC motor.

BACKGROUND

Electric vehicles and hybrid vehicles, which are equipped with an AC motor as their main engines, have received a lot of world attention in view of social requirements of low-fuel consumption and low emission. For example, a hybrid vehicle is composed of a DC power source, such as a secondary battery, an AC motor, and a control apparatus including a power converter, such as an inverter, and a controller. The inverter is connected between the DC power source and the AC motor. The controller controls the inverter to convert a DC voltage supplied from the DC power source into an AC voltage, and supplies the AC voltage to the AC motor, thus driving the AC motor.

The control apparatus for controlling an AC motor installed in a hybrid vehicle or an electric vehicle usually carries out feedback control of at least one controlled variable, such as a rotational speed or torque of the AC motor, using each phase current measured by a current sensor.

For example, when the control apparatus drives the inverter in a sinewave PWM control mode, the control apparatus converts each phase current measured by the current sensor into a d-axis current value and a q-axis current value in a d-q coordinate system, i.e. a two-phase rotating coordinate system, defined relative to a rotor of the AC motor. The control apparatus feeds back the d-axis current value and the q-axis current value from the AC motor to compare the d-axis current value and the q-axis current value with corresponding d-axis command current value and q-axis command current value determined based on a command value for the at least one variable of the AC motor. The control apparatus controls pulses, i.e. PWM pulses, to be supplied to switching elements of the inverter based on results of the comparison to control duty, i.e. duty factors, of the switching elements, thus converting a DC voltage input to the inverter into a sinewave AC voltage as an output of the inverter.

As another example, when the control apparatus drives the inverter in a rectangular control mode, i.e. a single-pulse control mode, the control apparatus estimates, based on a d-axis current value and a q-axis current value fed back from the AC motor, torque of the AC motor as the at least one variable. The control apparatus feeds back the estimated torque from the AC motor, and compares the estimated torque with request torque. Thus, the control apparatus controls operations of the switching elements of the inverter based on results of the comparison to thereby adjust a value of the estimated torque to a value of the request torque.

On the other hand, there is a motor control technology using the Fourier transform. For example, Japanese Patent Application Publication No. 2010-57218 discloses a technology that applies Fourier transform to a value of torque of an AC motor directly measured by a torque meter or a value of torque estimated based on a measured current value, thus extracting a desired-order signal component. Then, the technology performs learning for a power converter such that the coefficient of the desired-order signal component becomes zero in order to reduce torque ripples.

SUMMARY

In such a control apparatus for controlling an AC motor, there may be a problem of superimposition of harmonics, i.e. higher-order components, on at least one phase current flowing in the AC motor or a problem of phase-current offset. The phase-current offset will be described as follows. Specifically, a reference level of 0 [A] for each phase current is learned based on a level of a corresponding phase current at the start-up of the AC motor. However, the middle point of the peak-to-peak amplitude of at least one phase current is offset with respect to the reference level of 0 [A], which will be expressed as phase-current offset.

If harmonics are superimposed on at least one phase current, these harmonics may cause adverse effects on the duties of the switching elements of the inverter, resulting in higher-order noise included in noise caused by the switching operations of the switching elements. Particularly, let us consider the control apparatus driving the inverter in an over-modulation control mode. The over-modulation control mode controls the switching elements of the inverter using PWM pulses whose switching frequency is lower than that used in the sinewave PWM control mode. This converts a DC voltage input to the inverter into an AC voltage such that the amplitude of a fundamental component of the AC voltage is higher than the DC voltage within an over-modulation range of the inverter.

However, the over-modulation control mode may cause harmonics to be included in the PWM pulses, so that harmonics may be contained in each phase current, resulting in greater noise.

Phase-current offset occurring in at least one phase current may cause torque variations and/or power fluctuation. Torque variations caused from the control apparatus for an AC motor installed in a vehicle may result in a problem of vibration of the vehicle. Power fluctuation caused from the control apparatus for an AC motor installed in a vehicle may result in a problem of change in the power-supply current and voltage of the vehicle. The latter problem may provide adverse effects on electrical components, which are installed in the vehicle and operate based on the power-supply current and voltage.

In addition, let us consider that the control apparatus drives the inverter in a rectangular control mode, i.e. single-pulse control mode, for controlling a three-phase AC motor. The rectangular control mode controls the switching elements of the inverter using a lower switching frequency as compared with that used in the sinewave PWM control mode to convert a DC voltage input to the inverter to a rectangular AC voltage to be supplied to the three-phase AC motor.

The rectangular control mode is configured such that the upper- and lower-arm switching elements for each phase of the three-phase AC motor are complementarily turned on and off for each electrical-angle period of the three-phase AC motor. Thus, the total number of turn-on and turn-off of the switching elements for the three-phase AC motor becomes six for each electric-angle period of the three-phase AC motor, resulting in sixth-order components synchronized with the switching cycles being superimposed on, for example, each phase current flowing in the three-phase AC motor. The sixth-order components may also result in greater noise.

In view of these problems, the technology disclosed in the Patent Publication No. 2010-57218 merely discloses that application of a Fourier transform on a measured value or an estimated value of torque of an AC motor entirely aims to reduce torque ripples. Thus, it may be difficult for the technology disclosed in Patent Publication No. 2010-57218 to solve the problems due to noise based on harmonics and phase-current offset.

In view of the circumstances set forth above, one aspect of the present disclosure seeks to provide apparatuses for controlling an AC motor, which are designed to address the problems due to noise based on harmonics and phase-current offset set forth above.

Specifically, a first specific aspect of the present disclosure aims to provide such control apparatuses, each of which is capable of reducing noise based on harmonics and reducing phase-current offset.

Additionally, a second specific aspect of the present invention aims to provide such control apparatuses, each of which is capable of reducing processing load of the corresponding control apparatus.

According to a first exemplary aspect of the present disclosure, there is provided an apparatus for controlling a three-phase AC motor. The apparatus includes an inverter to which DC power is input. The inverter includes a plurality of switching elements connected to the AC motor. The apparatus includes a current sensor member measuring at least one phase current flowing in the AC motor as a first phase current, and a controller. The controller is configured to calculate a d-axis value and a q-axis value of a current vector in a d-q coordinate system defined in the AC motor based on the measured first phase current, and perform, based on the calculated d- and q-axis values of the current vector, at least one of a current-feedback task and a torque-feedback task.

The current-feedback task
(1) Compares the calculated d-axis value and q-axis value fed back from the AC motor with respective d-axis command current and q-axis command current
(2) Performs switching of the plurality of switching elements based on a result of the comparison to convert the DC power to controlled AC power
(3) Applies the controlled AC power to the AC motor, thus driving the AC motor.

The torque-feedback task
(1) Estimates torque of the AC motor based on the calculated d- and q-axis values of the current vector
(2) Compares the estimated torque fed back from the AC motor with request torque
(3) Performs switching of the plurality of switching elements based on a result of the comparison to convert the DC power to controlled AC power, and
(4) Applies the controlled AC power to the AC motor, thus driving the AC motor.

The controller is configured to, as the calculation of the d-axis value and the q-axis value of the current vector, perform a Fourier-coefficient obtaining task and a current-vector calculating task.

The Fourier-coefficient obtaining task is configured to expand one of the measured first phase current and another phase current into Fourier series of a corresponding one of the measured first phase current and the another phase current as a function of an electric rotational angle of the AC motor. The another phase current flows the AC motor and is estimated based on the measured first phase current. The Fourier-coefficient obtaining task is also configured to extract a first-order component from the Fourier series to thereby obtain first and second Fourier coefficients of the first-order component. The current-vector calculating task is configured to multiply the first and second Fourier coefficients by each of a first pair of temporally-invariant constants and a second pair of temporally-invariant constants. The current-vector calculating unit is also configured to calculate a first sum of the first and second Fourier coefficients, which have been respectively multiplied by the temporally-invariant constants of the first pair, and a second sum of the first and second Fourier coefficients, which have been respectively multiplied by the temporally-invariant constants of the second pair, to thereby obtain the d-axis value and the q-axis value of the current vector.

According to a second exemplary aspect of the present disclosure, there is provided an apparatus for controlling a three-phase AC motor. The apparatus includes an inverter to which DC power is input. The inverter includes a plurality of switching elements connected to the AC motor. The apparatus includes a current sensor member measuring a first phase current flowing in the AC motor, and a controller. The controller is configured to calculate a d-axis value and a q-axis value of a current vector in a d-q coordinate system defined in the AC motor based on the measured first phase current. The controller is also configured to perform, based on the calculated d- and q-axis values of the current vector, at least one of a current-feedback task and a torque-feedback task.

The current-feedback task:
(1) Compares the calculated d-axis value and q-axis value fed back from the AC motor with respective d-axis command current and q-axis command current
(2) Performs on- and off operations of the plurality of switching elements based on a result of the comparison to convert the DC power to controlled AC power
(3) Applies the controlled AC power to the AC motor, thus driving the AC motor.

The torque-feedback task:
(1) Estimates torque of the AC motor based on the calculated B- and q-axis values of the current vector
(2) Compares the estimated torque fed back from the AC motor with request torque
(3) Performs on- and off operations of the plurality of switching elements based on a result of the comparison to convert the DC power to controlled AC power
(4) Applies the controlled AC power to the AC motor, thus driving the AC motor.

The controller is configured to, as the calculation of the d-axis value and the q-axis value of the current vector, perform a filtering task and a current-vector calculating task.

The filtering task being configured to filter one of the measured first phase current and another phase current to emphasize a first-order component of a corresponding one of the measured first phase current and the another phase current, thus obtaining first and second coefficients of the first-order component. The current-vector calculating task is configured to multiply the first and second coefficients by each of a first pair of temporally-invariant constants and a second pair of temporally-invariant constants. The current-vector calculating unit is configured to calculate a first sum of the first and second Fourier coefficients, which haven been respectively multiplied by the temporally-invariant constants of the first pair, and a second sum of the first and second Fourier coefficients, which have been respectively multiplied by the temporally-invariant constants of the second pair, to thereby obtain the d-axis value and the q-axis value of the current vector.

The apparatus according to the first exemplary aspect of the present disclosure calculates the first and second Fourier coefficients of the first-order component of one of the measured first phase current and another phase current. Then, the apparatus according to the first exemplary aspect calculates the d-axis value and the q-axis value of the current vector directly from the first and second Fourier coefficients without calculating the first-order component of one of the measured first phase current and the another phase current. The apparatus according to the first exemplary aspect therefore achieves an advantage of reducing the amount of calculations, i.e. calculation processing load, required to calculate the current vector.

The apparatus according to the second exemplary aspect of the present disclosure calculates the first and second coefficients of the first-order component of one of the measured first phase current and another phase current. Then, the apparatus according to the second exemplary aspect calculates the d-axis value and the q-axis value of the current vector directly from the first and second coefficients without calculating the first-order component of one of the measured first phase current and the another phase current. The apparatus according to the first exemplary aspect therefore achieves an advantage of reducing the amount of calculations, i.e. calculation processing load, required to calculate the current vector.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 3 is a table schematically illustrating control modes used for the control apparatus for controlling the AC motor, and characteristics of the respective control modes;

FIG. 4 is a graph schematically illustrating a relationship between the control modes including corresponding feedback control methods and operating characteristics of the AC motor;

DETAILED DESCRIPTION OF EMBODIMENT

Specific embodiments of the present disclosure will be described hereinafter with reference to the accompanying drawings.

First, an example of the common structure of apparatuses for controlling an AC motor according to the specific embodiments of the present disclosure will be described hereinafter with reference to FIGS. 1 and 2. A control apparatus 10, which serves as one of apparatuses for controlling an AC motor according to the embodiments, is applied for a motor drive system 1 for driving an electromotive vehicle V as an example.

Figure 1:
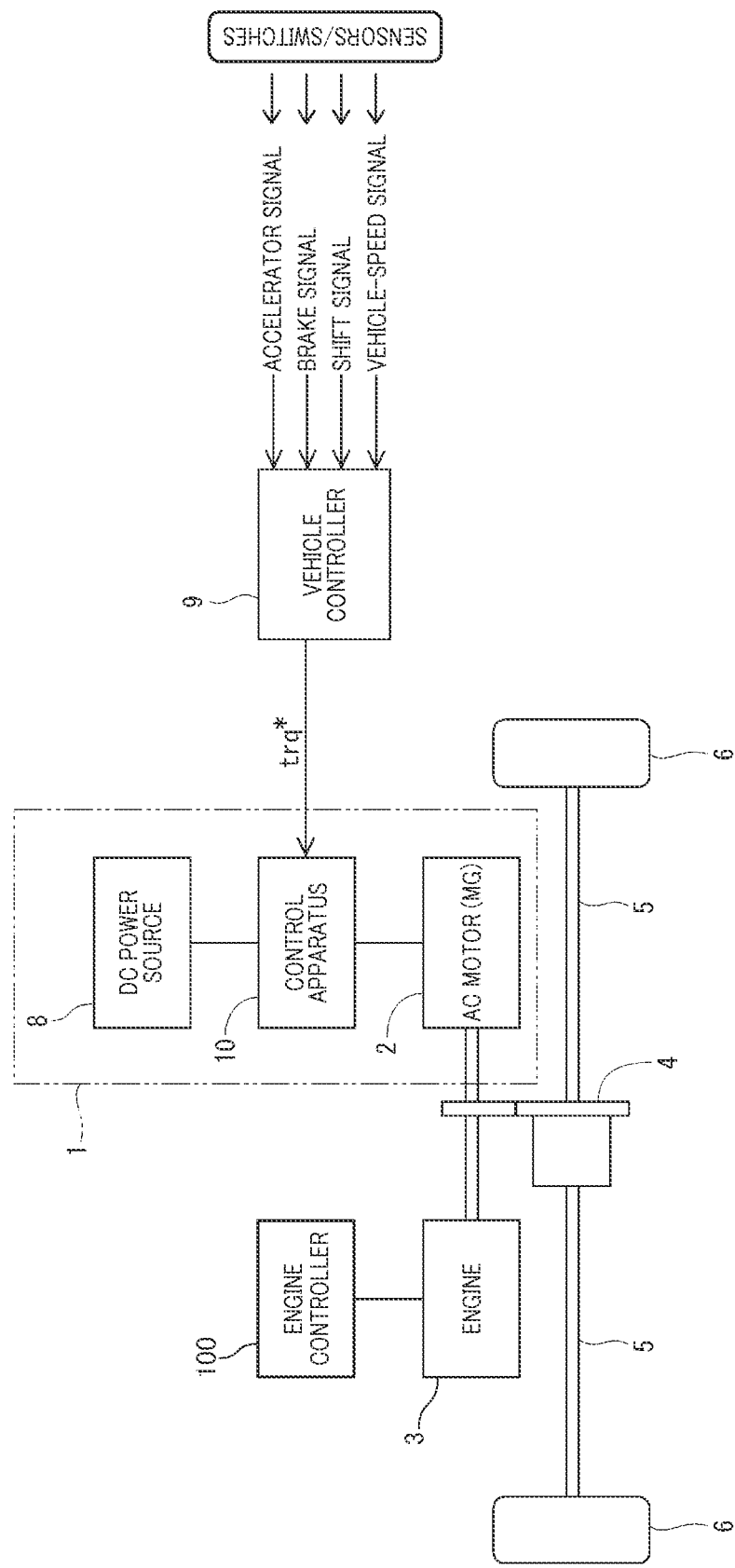
FIG. 1 is a structural view schematically illustrating an example of the motor drive system in which a control apparatus for controlling an AC motor according to each of first to sixth embodiments of the present disclosure is installed.

Referring to FIG. 1, the motor drive system 1 installed in the electromotive vehicle V includes an AC motor 2, a DC power source 8, a vehicle controller 9, and the control apparatus 10.

The AC motor 2 serves as a main engine of the vehicle V, and is operative to generate torque for rotatably driving the driving wheels 6 of the electromotive vehicle V, referred to simply as a vehicle V. For example, the AC motor 2 is a permanent magnet synchronous three-phase AC motor.

Electromotive vehicles used in the specific embodiments include vehicles that rotatably drive corresponding driving wheels 6 based on electrical energy, which includes, for example, hybrid vehicles, electric vehicles, and fuel-cell vehicles.

The AC motor 2 is a motor-generator (MG illustrated in some drawings). For example, the AC motor 2 is provided with a rotor and a stator (not shown); the rotor is, for example, directly or indirectly coupled to an output shaft, such as a crankshaft, of an engine 3 installed in the vehicle V to be rotatable together with the output shaft. The engine 3 serves as, for example, an auxiliary engine of the vehicle V that operates in cooperation with the AC motor 2.

The rotor is provided with at least one pair of permanent magnets.

The rotor has a direct axis (d-axis) in line with a direction of magnetic flux created by an N pole of the at least one pair of permanent magnets. The rotor also has a quadrature axis (q-axis) with a phase being π/2-radian electric angle leading with respect to a corresponding d-axis during rotation of the rotor. In other words, the q-axis is electromagnetically orthogonal to the d-axis (see FIG. 6A described later).

The d and q axes constitute a d-q coordinate system, i.e. a two-phase rotating coordinate system, defined relative to the rotor.

The stator includes a stator core such that the rotor is rotatably arranged with respect to the stator core. The stator also includes a set of three-phase windings, i.e. armature windings, wound in the stator core.

The three-phase, i.e. U-, V, and W-phase, stator windings are wound in the stator core such that the U-, V-, and W-phase windings are shifted by an electric angle of, for example, 2π/3 radian in phase from each other.

For example, the three-phase armature windings, i.e. U-, V-, and W-phase windings, each have one end connected to a common junction, i.e. a neutral point, and the other end to a separate terminal in, for example, a star-configuration.

Specifically, the AC motor 2 functions (1) As a motor to generate motion power for rotatably driving the driving wheels 6

(2) As a generator driven based on motion power supplied from the engine 3 of the vehicle V and/or the driving wheels 6, thus generating electrical power.

The AC motor 2 is coupled to an axle shaft 5 of the vehicle V via gears 4 of the vehicle V. This coupling causes the torque generated by the AC motor 2 to turn the axle shaft 5 via the gears 4, thus rotatably driving the driving wheels 6 respectively attached to both ends of the axle shaft 5. The DC power source 8 is an electrical storage device for charging power thereinto and discharging power therefrom. A secondary battery, such as a nickel-hydrogen battery or a lithium-ion rechargeable battery, or an electrical double layer capacitor can be used as the DC power source 8. The DC power source 8 is connected to the control apparatus 10, that is, an inverter 12 (described later and illustrated in FIG. 2) of the control apparatus 10. The DC power source 8 is configured to transfer electrical power therefrom to the AC motor 2 via the inverter 12, and receive electrical power transferred from the AC motor 2 via the inverter 12.

The vehicle controller 9 is designed as, for example, a microcomputer circuit. Specifically, the vehicle controller 9 essentially includes, for example, a CPU, a memory, such as a ROM and/or a RAM, an I/O, and a bus connecting between the CPU, memory, and I/O. The vehicle controller 9 can include at least one special-purpose electronic circuit. Specifically, the vehicle controller 9 is configured such that the CPU performs instructions of programs stored in the memory, thus performing predetermined software tasks associated with the whole of the vehicle V. The vehicle controller 9 can also be configured such that the at least one special-purpose electronic circuit performs predetermined hardware tasks associated with the whole of the vehicle V. The vehicle controller 9 can be configured to perform both the software tasks and the hardware tasks.

Various sensors and switches SS indicative of the driving conditions of the vehicle V are installed in the vehicle V. The sensors and switches SS include, for example, an accelerator sensor, a vehicle speed sensor, a brake switch, and a shift switch.

The accelerator sensor is operative to detect a position or stroke of a driver-operable accelerator pedal of the vehicle V, and output an accelerator signal indicative of the measured driver's operated position or stroke of the accelerator pedal to the vehicle controller 9.

The vehicle speed sensor is operative to measure the speed of the vehicle V, and operative to output, to the vehicle controller 9, a vehicle-speed signal indicative of the measured speed of the vehicle V.

The brake switch is operative to, for example, detect whether a brake pedal of the vehicle V is operated, and output, to the vehicle controller 9, a brake signal when it is determined that the brake pedal is operated.

The shift switch is operative to detect a driver's selected position of a transmission installed in the vehicle V, and output a shift signal indicative of the driver's selected position to the vehicle controller 9.

The vehicle controller 9 is configured to receive the signals sent from the sensors and/or switches SS, and detect the driving conditions of the vehicle V based on the received signals. The vehicle controller 9 is also configured to generate a value of request torque trq* according to the detected driving conditions of the vehicle V, and output the value of the torque request trq* to the control apparatus 10. The vehicle controller 9 is further configured to output, to an engine controller 100, such as an engine ECU 100, instruction signals that instruct the engine controller 100 to control various actuators of the engine 3 according to the detected driving conditions of the vehicle V.

Figure 2:
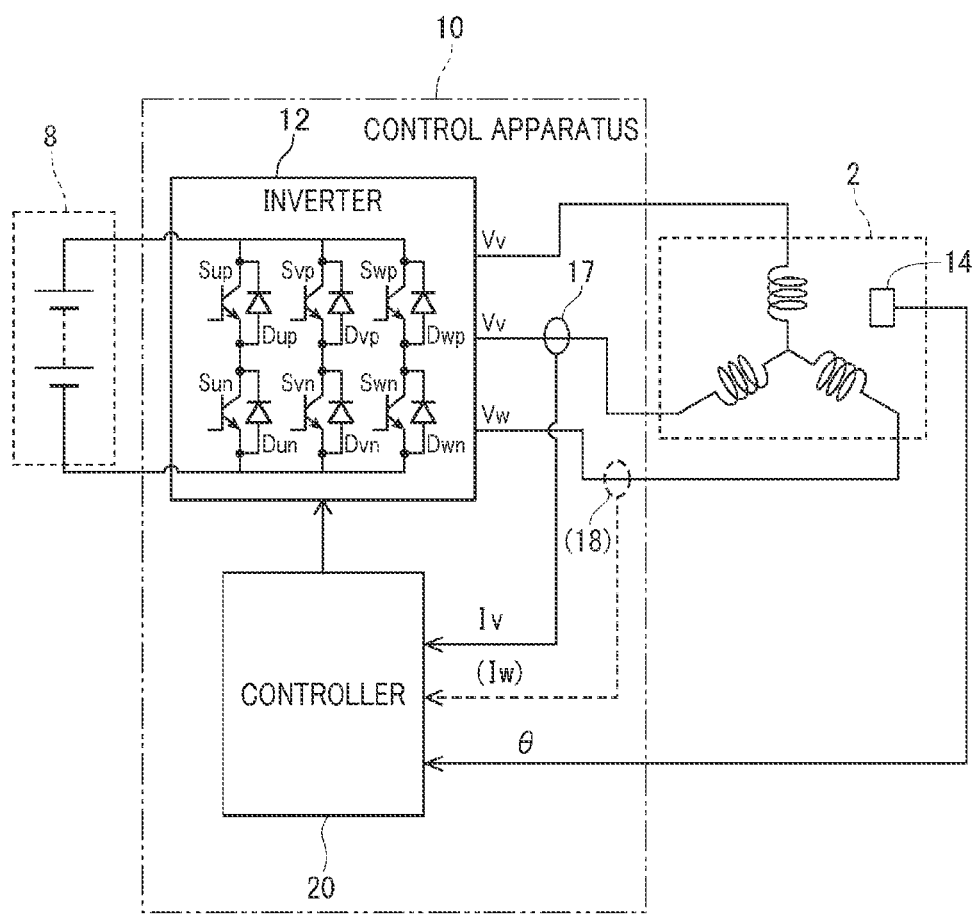
FIG. 2 is a circuit diagram schematically illustrating an example of the circuit structure of the control apparatus illustrated in FIG. 1.

Referring to FIG. 2, the control apparatus 10 is comprised of an inverter 12, a rotational angle sensor 14, at least one of current sensors 17 and 18, and a controller 20.

The inverter 12 is designed as a three-phase inverter. The inverter 12 is provided with a first pair of series-connected high- and low-side (upper- and lower-arm) switching elements Sup and Sun, a second pair of series-connected high- and low-side switching elements Svp and Svn, and a third pair of series-connected high- and low-side switching elements Swp and Swn. The inverter 12 is also provided with flywheel diodes Dup, Dun, Dvp, Dvn, Dwp, and Dwn electrically connected in antiparallel to the respective switching elements Sup, Sun, Svp, Svn, Swp, and Swn.

The first to third pairs of switching elements are parallely connected to each other in bridge configuration.

As the switching elements S*# (*=u, v, and w, and #=p and n), IGBTs, MOSFETS, or bipolar transistors can be respectively used. When MOSFETs are used as the switching elements S*#, intrinsic diodes of the power MOSFETs can be used as the flywheel diodes, thus eliminating the need for external flywheel diodes.

A connecting point, through which the switching elements Sup and Sun of the first pair are connected to each other in series, is connected to an output lead extending from the separate terminal of the U-phase winding. Similarly, a connecting point, through which the switching elements Svp and Svn of the second pair are connected to each other in series, is connected to an output lead extending from the separate end of the V-phase winding. Moreover, a connecting point, through which the switching elements Swp and Swn of the third pair are connected to each other in series, is connected to an output lead extending from the separate end of the W-phase winding.

One end of the series-connected switching elements of each of the first, second, and third pairs is connected to the positive terminal of the DC power source 8 via a positive terminal of the inverter 12. The other end of the series-connected switching elements of each of the first, second, and third pairs is connected to the negative terminal of the DC power source 8 via a negative terminal of the inverter 12. Each of the switching elements S*# has a control terminal connected to the controller 20.

For example, when driving the inverter 12 in a sinewave PWM control mode or an over-modulation control mode, the controller 20 controls on-off operations of the switching elements S*# typically using PWM pulses. This control converts a DC voltage input to the inverter 12 from the DC power source 8 into three-phase AC voltages Vu, Vv, and Vw. Then, the controller 20 applies the three-phase AC voltages Vu, Vv, and Vw to the AC motor 2, thus controlling electrical driving of the AC motor 2.

When driving the inverter in a rectangular control mode, the controller 20 obtains torque deviation of estimated torque of the AC motor 2 from request torque, and controls on-off operations of the switching elements S*# based on a command value for desired voltage phase; the desired voltage phase compensates for the torque deviation. The sinewave PWM control mode, the over-modulation control mode, and the rectangular control mode are three control modes according to the embodiments.

The at least one of current sensors 17 and 18 is connected to the controller 20. The at least one of the current sensors 17 and 18 is operative to measure at least one current flowing in the AC motor 2, and output, to the controller 20, the measured value of the at least one current; the at least one current is used for the controller 20 to control on-off operations of the switching elements S*#.

Specifically, the at least one of current sensors 17 and 18 is different from current sensors for monitoring currents flowing in the motor drive system 1 in order to determine whether there is at least one malfunction in the motor drive system 1.

Specifically, the control apparatus 10 according to each of the embodiments is configured as one of a first pattern and a second pattern:

(1) The first pattern is that two or three current sensors are provided for corresponding respective phase windings (2) The second pattern is that a single current sensor is provided for one phase winding.

Thus, as illustrated in FIG. 2, the reference numeral of the current sensor 18 is parenthesized, and the current sensor 18 itself and an arrow directing from the current sensor 18 to the controller 20 are shown as dashed lines.

In the first pattern, the current sensors 17 and 18 are provided for, for example, the output leads extending from the separate terminals of the respective V- and W-phase windings. The current sensors 17 and 18 are operative to measure values of respective V- and W-phase currents Iv and Iw flowing through the respective V- and W-phase windings. Because the sum of the three-phase currents is always zero from Kirchhoff's law, it is possible for the controller 20 to calculate a value of a remaining phase current, such as a U-phase current Iu, based on the measured values of the V- and W-phase currents Iv and Iw. Thus, it is possible for the controller 20 to perform various operations, such as dq command-current calculating operations, under execution of current-feedback control, according to the measured values of at least two-phase currents.

The current sensors 17 and 18 can be provided for the output leads extending from the separate terminals of the respective U- and V-phase windings or U- and W-phase windings. In addition, three current sensors can be provided for the output leads extending from the separate terminals of the respective three-phase windings.

In the second pattern, the current sensor 17 is provided for, for example, the output lead extending from the separate terminal of the V-phase winding. The current sensor 17 is operative to measure a value of the V-phase current Iv flowing through the V-phase winding. The current sensor 17 can be provided for the output lead extending from the separate terminal of the U-phase winding or W-phase winding. Specifically, in the second pattern, it is possible for the controller 20 to (1) Estimate, based on the measured value of one-phase current, values of the remaining two-phase currents (2) Perform various operations, such as dq command-current calculating operations, under execution of current-feedback control, according to the measured value of the one phase current and the estimated values of the remaining two-phase currents.

The rotational angle sensor 14 includes, for example, a resolver. The rotational angle sensor 14 is disposed to be adjacent to the rotor of the AC motor 2, and is connected to the controller 20. The rotational angle sensor 14 is configured to measure, i.e. monitor, a rotational electric angle $\theta$ of the rotor of the AC motor 2, and output, to the controller 20, the measured rotational electric angle $\theta$ of the rotor of the AC motor 2. This permits the controller 20 to calculate the rotational speed Nr, i.e. the number of revolutions, of the rotor of the AC motor 2 based on the rotational electric angle $\theta$. Another type of rotational angle sensor, such as a rotational angle sensor including a rotary encoder, can be used.

The controller 20 is designed as, for example, a microcomputer circuit. Specifically, the controller 20 essentially includes, for example, a CPU, a memory, such as a ROM and/or a RAM, an I/O, and a bus connecting between the CPU, memory, and I/O. The controller 20 can include at least one special-purpose electronic circuit. Specifically, the controller 20 is configured such that the CPU performs instructions of programs stored in the memory, thus performing various software tasks, such as tasks for controlling the operations of the AC motor 2. The controller 20 can also be configured such that the at least one special-purpose electronic circuit performs various hardware tasks, such as tasks for controlling the operations of the AC motor 2. The controller 20 can be configured to perform both the software tasks and the hardware tasks. Functional structures of the controller 20 will be described later for the respective embodiments.

Specifically, the control apparatus 10 is configured to cause, using the rotational speed Nr calculated based on the measured rotational electric angle $\theta$, and the value of the request torque trq* supplied from the vehicle controller 9, the AC motor 2 to serve as (1) A motor operating in a power running mode to thereby consume electrical power (2) A generator operating in a regenerative mode to thereby generate electrical power, i.e. regenerative power.

More specifically, the control apparatus 10 is configured to select the operation mode, i.e. drive mode, of the AC motor 2 among one of 1. A forward power running mode in which the AC motor 2 serves a motor to consume electrical power when the rotational speed Nr and the value of the request torque trq* are positive 2. A forward regenerative mode in which the AC motor 2 serves a generator to thereby generate regenerative power when the rotational speed Nr is positive and the value of the request torque trq* is negative 3. A backward power running mode in which the AC motor 2 serves a motor to consume electrical power when the rotational speed Nr and the value of the request torque trq* are negative 4. A backward regenerative mode in which the AC motor 2 serves a generator to thereby generate regenerative power when the rotational speed Nr is negative and the value of the request torque trq* is positive.

That is, the forward power running mode shows that the vehicle V is running while accelerating in a forward direction, so that the AC motor 2 serves as a motor to convert electrical power into motion power. The forward regenerative mode shows that the vehicle V is running while decelerating in the forward direction, so that the AC motor 2 serves as a generator to convert motion power to electrical power.

The backward power running mode shows that the vehicle V is running while accelerating in a backward direction, so that the AC motor 2 serves as a motor to convert electrical power into motion power. The backward regenerative mode shows that the vehicle V is running while decelerating in the backward direction, so that the AC motor 2 serves as a generator to convert motion power to electrical power.

Specifically, let us consider the forward power running mode when the rotational speed Nr is more than zero, i.e. the vehicle V is running in the forward direction, and the value of the request torque trq* is more than zero. In the forward power running mode, the controller 20 controls on-off operations of the switching elements S*# of the inverter 12 to convert DC power supplied from the DC power source 8 into AC power, thus supplying the AC power to the AC motor 2. This causes the AC motor 2 to serve as a motor to generate positive torque, so that the vehicle V is running in the forward direction based on the generated positive torque.

Next, let us consider the backward power running mode when the rotational speed Nr is less than zero, i.e. the vehicle V is running in the backward direction, and the value of the request torque trq* is more than zero. In the backward power running mode, the controller 20 controls on-off operations of the switching elements S*# of the inverter 12 to convert DC power supplied from the DC power source 8 into AC power, thus supplying the AC power to the AC motor 2. This causes the AC motor 2 to serve as a motor to generate negative torque, so that the vehicle V is running in the backward direction based on the generated negative torque.

In addition, let us consider the forward regenerative mode when the rotational speed Nr is more than zero, i.e. the vehicle V is running in the forward direction, and the value of the request torque trq* is less than zero. In the forward regenerative mode, the controller 20 controls on-off operations of the switching elements S*# of the inverter 12 to convert AC power generated by the AC motor 2 into DC power, thus supplying the DC power to the DC motor 2. Similarly, in the backward regenerative mode, the controller 20 controls on-off operations of the switching elements S*# of the inverter 12 to convert AC power generated by the AC motor 2 into DC power, thus supplying the DC power to the DC motor 2.

Next, control modes used by the control apparatus 10 for controlling the AC motor 2 will be described hereinafter with reference to FIG. 3.

The control apparatus 10 is configured to select one of the three control modes according to a modulation factor m. The modulation factor m is defined as the following equation [1]:

$$m = 2\sqrt{\frac{2}{3}} \frac{Vr}{VH} \quad [1]$$

where VH represents a system voltage VH input to the inverter 12, and Vr represents the magnitude of a voltage vector Vr in the d-q coordinate system.

Note that $$\frac{Vr}{VH}$$

represents a voltage utilization factor of the inverter 12.

When the modulation factor m is set to be greater than 0 and smaller than 1.27, the control apparatus 10 selects the sinewave PWM control mode or the over-modulation control mode.

In the sinusoidal PWM control mode, the control apparatus 10 performs a PWM control task. The PWM control task compares in amplitude each of three-phase sinewave command voltages with a carrier signal. Then, the PWM control task controls on and off operations of the switching elements S*# according to the compared results. Specifically, the PWM control task controls a duty, i.e. duty factor, representing a controllable ratio, i.e. percentage, of an on duration to a total duration of each switching cycle for each of the switching elements S*# within a predetermined period of time. This PWM control changes on-pulse widths and off-pulse widths of the switching elements S# for each phase within the predetermined period of time such that a fundamental component of an output voltage, i.e. a line-to-line voltage, of the inverter 12 has a pseudo sinusoidal waveform.

In the sinewave PWM control mode, the amplitude of each of the three-phase sinewave command voltages is limited to be within the range of the amplitude, i.e. the system voltage VH, of the carrier signal, so that, as described above, a line-to-line voltage output from the inverter 12 to be applied to the AC motor 2 has a pseudo sinusoidal waveform.

In the over-modulation control mode, i.e. over-modulation PWM control mode, the control apparatus 10 performs a PWM control task like the sinewave PWM control mode such that the amplitude of each of the three-phase sinusoidal command voltages is higher than the amplitude of the carrier signal. Particularly, in the over-modulation mode, the control apparatus 10 is capable of performing a voltage-amplitude correction that distorts each of the three-phase sinusoidal command voltages from a corresponding original sinusoidal waveform. This makes it possible to increase the amplitude of the fundamental component of the output voltage of the inverter 12. In the over-modulation control mode, the amplitude of each of the three-phase sinusoidal command voltages is greater than that of the carrier signal, so that a line-to-line voltage output from the inverter 12 to be applied to the AC motor 2 has a distorted sinusoidal waveform.

The control apparatus 10 is configured to perform the current-feedback control that performs on-off operations of the switching elements S*# based on the measured and/or estimated values of the three-phase currents flowing in the AC motor 2, which are fed back from the AC motor 2. This current-feedback control results in control of the amplitude and phase of a line-to-line voltage to be applied to the AC motor 2.

In contrast, when the modulation factor m is set to 1.27, the control apparatus 10 selects the rectangular control mode. In the rectangular control mode, the control apparatus 10 applies a rectangular AC voltage for each phase as a corresponding line-to-line rectangular voltage to the AC motor 2. Specifically, an on-off pulse pattern of the switching elements S*# is designed such that the ratio of on duration to an off duration for each of the switching elements S*# of the inverter 12 are set to 1:1 within the predetermined period of time. In the rectangular control mode, the amplitude of a line-to-line voltage to be applied to the AC motor 2 is fixed, so that the control apparatus 10 is configured to perform torque-feedback control. The torque-feedback control controls the phase of the rectangular AC voltage for each phase based on a difference between estimated torque fed back from the AC motor 2 and request torque.

FIG. 4 schematically illustrates a relationship between the control modes including corresponding feedback control methods and operating characteristics including the output torque and the rotational speed Nr, of the AC motor 2.

In the AC motor 2, an increase of the rotational speed Nr and/or the output torque of the AC motor 2 causes a voltage, i.e. a back electromotive force, induced in the AC motor 2 to increase, resulting in an increase of a voltage required to drive the AC motor 2. Thus, it is necessary to increase the system voltage VH to be higher than the voltage required to drive the AC motor 2. Preferably, the control apparatus 10 is configured to switch the control mode for the inverter 12 from the sinewave PWM control mode to the over-modulation control mode and further from the over-modulation control mode to the rectangular control mode when the system voltage VH becomes a predetermined maximum voltage. This configuration improves the modulation factor.

As schematically illustrated in FIG. 4, the control apparatus 10 can be configured to select 1. The sinewave PWM control mode as the control mode for the inverter 12 when the rotational speed Nr of the AC motor 2 is within a low-speed range I in order to reduce torque variations 2. The over-modulation control mode as the control mode for the inverter 12 when the rotational speed Nr of the AC motor 2 is within a middle-speed range II higher than the low-speed range I in order to improve motor output 3. The rectangular control mode as the control mode for the inverter 12 when the rotational speed Nr of the AC motor 2 is within a high-speed range III higher than the middle-speed range II in order to improve motor output.

Particularly, selection of the rectangular control mode when the rotational speed Nr of the AC motor 2 is within a high-speed range III improves output, i.e. output torque, of the AC motor 2 (see FIG. 4).

Next, specific structures and operations of the controller 20 for the control apparatuses 10 according to the respective embodiments, i.e. first to sixth embodiments, will be individually described hereinafter. That is, reference numerals 201, 202, 203, 204, 205, and 206 are assigned to the controllers 20 according the following first, second, third, fourth, fifth and sixth embodiments. In the following first to sixth embodiments, like parts between the first to sixth embodiments, to which like reference characters are assigned, are omitted or simplified to avoid redundant description.

The controllers 201 to 205 according to the first to fifth embodiments are each configured to extract, from at least one phase current, a first-order current component, i.e. a fundamental current component thereof, using Fourier series expansion. Particularly, the controllers 201 to 204 according to the first to fourth embodiments are each configured to perform the current-feedback control, and the controller 205 according to the fifth embodiment is configured to perform the torque-feedback control. The controller 206 according to the sixth embodiment includes a modified configuration of one of the controllers 201 to 205.

First, the control apparatuses 10 respectively equipped with the controllers 201 to 203 according to the first to third embodiments will be described hereinafter with reference to FIGS. 5 to 8. The control apparatus 10 according to the first embodiment is designed based on the second pattern such that a single current sensor 17 is provided for, for example, the V-phase stator winding of the AC motor 2 (see FIG. 5). The control apparatuses 10 according to the respective second and third embodiments are each designed based on the second pattern such that current sensors 17 and 18 are provided for, for example, the V- and W-phase stator windings of the AC motor 2, respectively (see FIGS. 7 and 8).

Figure 5:
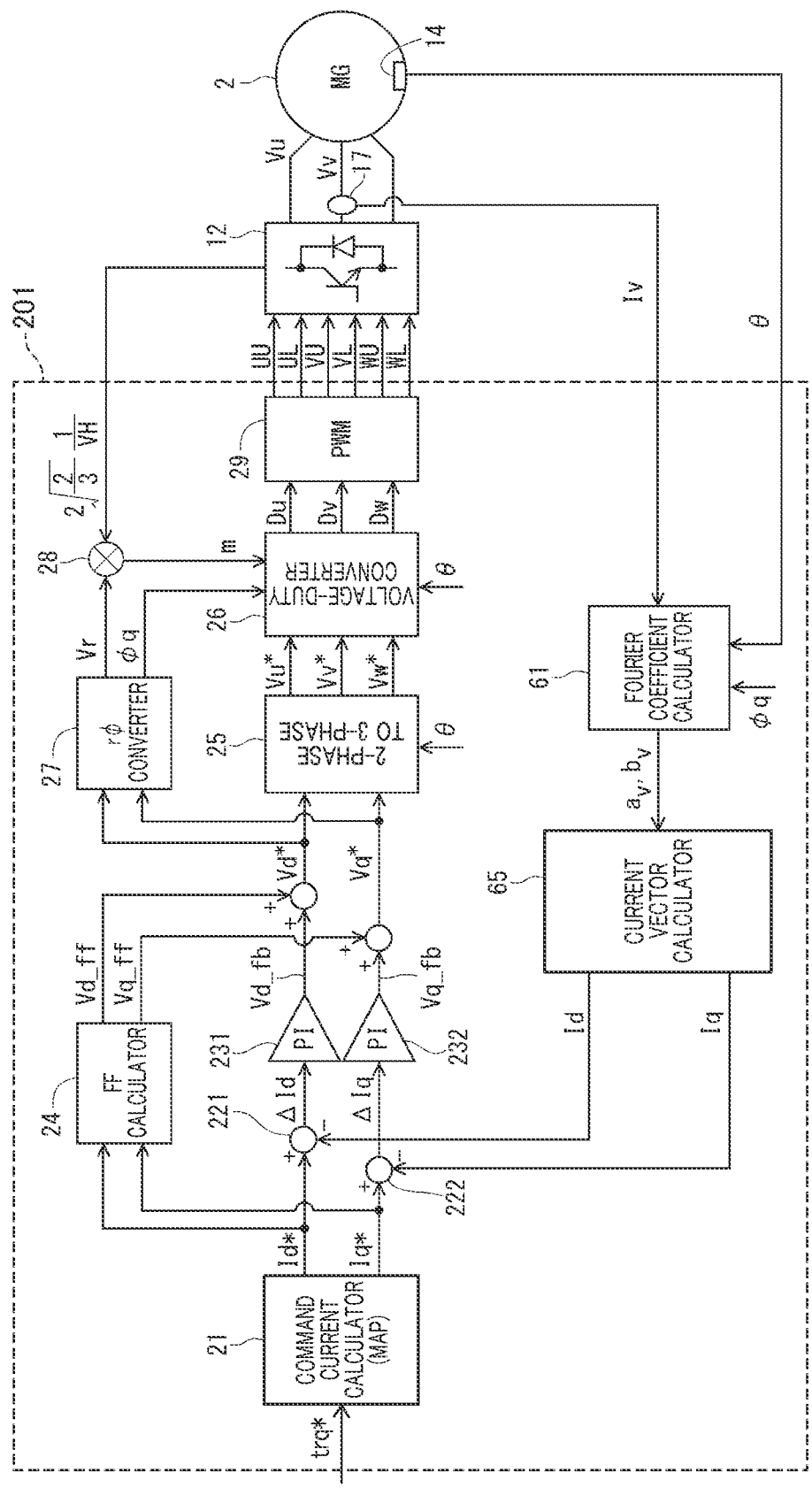
FIG. 5 is a schematic functional block diagram of a controller of the control apparatus according to the first embodiment.

An example of the structure of the controller 201 will be described hereinafter with reference to FIGS. 5 and 6; FIG. 5 schematically illustrates a functional block diagram of the controller 201, and FIG. 6B illustrates a detailed structure of a r$\phi$ converter 27 illustrated in FIG. 5.

The controller 201 includes a command current calculator 21, a first subtractor 221, a second subtractor 222, a first PI operator 231, a second PI operator 232, and a feedforward (FF) calculator 24. The controller 201 also includes a first adder 241, a second adder 242, a two-phase to three-phase converter 25, a voltage-duty converter 26, the r$\phi$ converter 27, a multiplier 28, and a PWM-signal generator 29. The controller 201 also includes a Fourier-coefficient calculator 61 and a current-vector calculator 65. The two-phase to three-phase converter 25 is simply illustrated in FIG. 5 as 2-PHASE TO 3-PHASE. For example, the Fourier-coefficient calculator 61 and the current-vector calculator 65 constitute a current-feedback system of the controller 201.

The modules included in the controller 201 cooperatively operate to carry out the current-feedback control. The modules can be implemented as hardware modules, software modules, and/or hardware-software hybrid modules.

The command current calculator 21 is operative to calculate a command d-axis current id* and a command q-axis current iq* in the d-q coordinate system of the rotor of the AC motor 2 according to the value of the request torque trq* supplied from the vehicle controller 9. The command d-axis current id* and a command q-axis current iq* are required to obtain torque of the AC motor 2 matching with the value of the request torque trq*.

For example, the command current calculator 21 has a map in data-table format, in mathematical expression format, and/or program format. The map includes information indicative of a relationship between values of each of the command d-axis current Id* and the command q-axis current Iq*, and values of the request torque trq*. Specifically, the command current calculator 21 refers to the map, and extracts a value of each of the command d-axis current Id* and the command q-axis current Iq* corresponding to the input value of the request torque trq*. Note that a d-axis current and a q-axis current will be simply described as d-q axis currents hereinafter. In addition, note that current vectors described hereinafter represent current vectors in the d-q coordinate system of the rotor of the AC motor 2.

The first subtractor 221 is operative to subtract a d-axis current value Id fed back from the current-vector calculator 65 from the command d-axis current Id* to thereby calculate a d-axis deviation $\Delta$id. The second subtractor 222 is operative to subtract a q-axis current value Iq fed back from the current-vector calculator 65 from the command q-axis current iq* to thereby calculate a q-axis deviation $\Delta$iq. Detailed operations of the current-vector calculator 65 will be described later.

The first PI operator 231 is operative to perform a PI operation using the d-axis deviation Δid as input data, and a proportional gain term and an integral gain term of a PI feedback control algorithm (PI algorithm), thus calculating a feedback term Vd_fb of a command d-axis voltage such that the d-axis deviation Δid converges to zero. The second PI operator 232 is operative to perform a PI operation using the q-axis deviation Δiq as input data, and a proportional gain term and an integral gain term of a PI feedback control algorithm (PI algorithm), thus calculating a feedback term Vq_fb of a command q-axis voltage such that the q-axis deviation Δiq converges to zero.

The feedforward calculator 24 is operative to calculate, based on the d-q axis command currents Id* and Iq*, a feedforward term Vd_ff of the command d-axis voltage and a feedforward term Vq_ff of the command q-axis voltage using, for example, predetermined information. The predetermined information represents a relationship between values of the d-q axis command currents Id* and Iq* and corresponding values of the feedforward terms Vd_ff and Vq_ff of the command d-q axis voltages. The first adder 241 is operative to add the feedforward term Vd_ff of the command d-axis voltage to the feedback term Vd_fb of the command d-axis voltage, thus calculating the command d-axis voltage represented as Vd*. The second adder 242 is operative to add the feedforward term Vq_ff of the command q-axis voltage to the feedback term Vq_fb of the command q-axis voltage, thus calculating the command q-axis voltage represented as Vq*.

To the two-phase to three-phase converter 25, the command d-axis voltage Vd* and command q-axis voltage Vq* calculated by the respective adders 241 and 242, and the rotational electric angle θ of the rotor of the AC motor 2 measured by the rotational angle sensor 14 are input.

Then, the two-phase to three-phase converter 25 converts the command d-axis voltage Vd* and command q-axis voltage Vq* into three-phase command voltages Vu*, Vv*, and Vw* using the rotational electric angle θ and, for example, map data or equation data. The map data or equation data represents correlations between values of the three-phase command voltages Vu*, Vv*, and Vw*, values of the command d-axis voltage Vd* and command q-axis voltage Vq*, and values of the rotational electric angle θ.

The voltage-duty converter 26 is operative to convert the three-phase command voltages Vu*, Vv*, and Vw* into command duties Du, Dv, and Dw using the rotational electric angle θ, a phase difference, i.e. a phase difference angle, φq calculated by the rφ converter 27, the modulation factor m obtained from the multiplier 28, and the following equations [2.1], [2.2], and [2.3]:

$$Du = 0.5 + 0.5 \times m \cdot \cos(\theta + \phi q + 90°) \quad [2.1]$$

$$Dv = 0.5 + 0.5 \times m \cdot \cos(\theta + \phi q - 30°) \quad [2.2]$$

$$Dw = 0.5 + 0.5 \times m \cdot \cos(\theta + \phi q + 210°) \quad [2.3]$$

As illustrated in FIG. 6B, the rφ converter 27 is operative to convert the command d-axis voltage Vd* and command q-axis voltage Vq* into a command voltage vector; the command voltage vector has a magnitude Vr, and the phase difference φq with respect to the q-axis in the d-q coordinate system. Note that the anticlockwise direction of the phase difference φq with respect to the q-axis in the d-q coordinate system is set to a positive direction of the phase difference φq. The clockwise direction of the phase difference φq with respect to the q-axis in the d-q coordinate system is therefore set to a negative direction of the phase difference φq.

The multiplier 28 is operative to calculate the modulation factor m using the system voltage VH input to the inverter 12, the magnitude Vr of the command voltage vector calculated by the rφ converter 27, and the equation [1] set forth above.

The PWM-signal generator 29 is operative to calculate, based on the command duties Du, Dv, and Dw, drive signals UU, UL, VU, VL, WU, and WL for the respective switching elements Sup, Sun, Svp, Svn, Swp, and Swn of the inverter 12. Each of the drive signals UU, UL, VU, VL, WU, and WL is a pulse signal with a controllable duty cycle (controllable pulse width) for a corresponding switching cycle. The drive pulses UU, UL, VU, VL, WU, and WL are required for the AC motor 2 to generate three-phase voltages Vu, Vv, and Vw corresponding to the respective three-phase command voltages Vu*, Vv*, and Vw*.

That is, the controller 201 is operative to perform on-off operations of the switching elements Sup, Sun, Svp, Svn, Swp, and Swn of the inverter 12 based on the respective drive pulses UU, UL, VU, VL, WU, and WL, thus generating the three-phase voltages Vu, Vv, and Vw as output of the inverter 12. The three-phase voltages Vu, Vv, and Vw are applied to the AC motor 2, so that the AC motor 2 is driven based on the three-phase voltages Vu, Vv, and Vw to generate torque matching with the value of the request torque trq*.

Next, the structure and operations of the current-feedback system of the controller 201 will be described in detail hereinafter. As described above, the control apparatus 10 according to the first embodiment is designed such that a single current sensor 17 is provided for the V-phase stator winding of the AC motor 2 (see FIG. 5). Of course, the following structure and operations of the current-feedback system of the controller 201 can be applied to the current-feedback system of the controller 201 when the single current sensor 17 is provided for the U- or W-phase stator winding of the AC motor 2.

Under control of electrical drive of the AC motor 2, higher-order components may be superimposed on the V-phase current Iv measured by the current sensor 17, or there may be a problem of phase-current offset for the V-phase current Iv measured by the current sensor 17. As described above, the phase-current offset for the V-phase current Iv is that the middle point of the peak-to-peak amplitude of the V-phase current Iv is offset with respect to the reference level of 0 [A].

If the d-q axis current values Id and Iq obtained based on the U-, V-, and W-phase currents Iu, Iv, and Iw with the V-phase current Iv containing higher-order components were fed back to the respective first and second subtractors 221 and 222, higher-order components might be superimposed on the command duties Du, Dv, and Dw. This might cause higher-order noise to be included in noise caused by the switching operations of the switching elements S*#, resulting in adverse effects the motor drive system 1 in quietness. Particularly, the over-modulation control mode may cause harmonics to be included in the PWM pulses, so that harmonics are likely to be contained in at least the V-phase current Iv measured by the current sensor 17, resulting in greater noise.

Phase-current offset occurring in the V-phase current Iv might cause torque variations and/or power fluctuation. Torque variations caused from the control apparatus 10 for the AC motor 2 installed in the vehicle V might result in a problem of vibration of the vehicle V. Power fluctuation caused from the control apparatus 10 for the AC motor 2 installed in the vehicle V might result in a problem of change in the power-supply current and voltage of the vehicle V. The latter problem might cause adverse effects on electrical components, which are installed in the vehicle V and operate based on the power-supply current and voltage.

Note that the major factor of the phase-current offset occurring in the V-phase current Iv results from the temperature characteristics of the circuit of the control apparatus 10 that receives the V-phase current Iv measured by the current sensor 17. The magnitude of the phase-current offset likely increases as the continued operations of the control apparatus 10 increase.

In order to address these problems, the controller 201 according to the first embodiment includes, as the current-feedback system, a structure that (1) Expands at least one phase current measured by the current sensor 17 or 18 as Fourier series that are functions of the rotational electric angle $\theta$;

(2) Extracts a first-order component of the Fourier series of the at least one phase current to thereby eliminate higher-order components from a corresponding phase current (3) Calculate a current vector, i.e. a d-axis current value Id and a q-axis current value Iq of the current vector, based on the first-order component of each phase current.

Specifically, the controller 201 according to the first embodiment includes, as an example of the structure, the Fourier-coefficient calculator 61 and the current-vector calculator 65.

The controller 201 according to the first embodiment is specially configured to calculate coefficients, i.e. Fourier coefficients, of the first-order component of at least one phase current, and directly calculate the current vector using the Fourier coefficients of the at least one phase current without calculating the first-order component of the at least one phase current.

Next, the theory on which operations of the Fourier-coefficient calculator 61 and the current-vector calculator 65 are based will be described hereinafter.

First, operations of the Fourier-coefficient calculator 61 will be described hereinafter.

General expressions of Fourier coefficients are represented as the following equations [3.1] and [3.2], and a general expression of Fourier series expansion is represented as the following equation [3.3]:

$$\begin{cases} a_n = \frac{1}{\pi}\int_{-\pi}^{\pi} f(\theta)\cos n\theta\, d\theta, n = 0, 1, 2, \ldots & [3.1] \\ b_n = \frac{1}{\pi}\int_{-\pi}^{\pi} f(\theta)\sin n\theta\, d\theta, n = 0, 1, 2, \ldots & [3.2] \end{cases}$$

$$f(\theta) = \frac{a_0}{2} + \sum_{n=1}^{\infty}(a_n\cos n\theta + b_n\sin n\theta) \quad [3.3]$$

where $f(\theta)$ represents a periodic function of A with period $2\pi$ (360°), which is represented as the sum of trigonometric functions, $a_n$ represents a nth Fourier coefficient of cosine function, and $b_n$ represents an nth Fourier coefficient of sine function.

The Fourier-coefficient calculator 61 is configured to divide the integral from $-\pi$ (−180°) to $\pi$ (180°) of $f(\theta)\cos n\theta$ by $\pi$ to thereby calculate the nth Fourier coefficient of cosine function. Similarly, the Fourier-coefficient calculator 61 is configured to divide the integral from $-\pi$ to $\pi$ of $f(\theta)\sin n\theta$ by $\pi$ to thereby calculate the nth Fourier coefficient of sine function.

The Fourier-coefficient calculator 61 is configured to apply a phase current as a function of the rotational electric angle $\theta$ to $f(\theta)$. Note that $$\frac{a_0}{2}$$

in the equation [3.3], which represents a zeroth order component, i.e., represents an offset of the middle point of the peak-to-peak amplitude of a corresponding phase current with respect to the reference level of 0 [A].

That is, the Fourier-coefficient calculator 61 is configured to eliminate the higher-order components, where n are equal to or higher than 2, from each of the equations [3.1] and [3.2], and extract the first-order component, i.e. n is equal to 1, from each of the equations [3.1] and [3.2], thus establishing first-order coefficients, i.e. first-order Fourier coefficients, of the respective U-, V-, and W-phase currents Iu, Iv, and Iw as the following equations:

$$a_u = \frac{1}{\pi}\int_{-\pi}^{\pi} I_u(\theta)\cos\theta\, d\theta \quad [4.1]$$

$$b_u = \frac{1}{\pi}\int_{-\pi}^{\pi} I_u(\theta)\sin\theta\, d\theta \quad [4.2]$$

$$a_v = \frac{1}{\pi}\int_{-\pi}^{\pi} I_v(\theta)\cos\theta\, d\theta \quad [5.1]$$

$$b_v = \frac{1}{\pi}\int_{-\pi}^{\pi} I_v(\theta)\sin\theta\, d\theta \quad [5.2]$$

$$a_w = \frac{1}{\pi}\int_{-\pi}^{\pi} I_w(\theta)\cos\theta\, d\theta \quad [6.1]$$

$$b_w = \frac{1}{\pi}\int_{-\pi}^{\pi} I_w(\theta)\sin\theta\, d\theta \quad [6.2]$$

In the equation [4.1], the index of the first-order Fourier coefficient should be represented as $a_{1u}$ in order to represent the first-order Fourier coefficient where n is equal to 1. However, because no higher-order Fourier coefficients where n is equal to or higher than 2 will be described in the first embodiment and the following embodiments, the index 1 of the first-order Fourier coefficient in the equation [4.1] is eliminated, so that the first-order Fourier coefficient in the equation [4.1] is simply represented as $a_u$. The other equations [4.2] to [6.2] can be represented in the same manner as the equation [4.1]. Hereinafter, a simply described "Fourier coefficient" represents a first-order Fourier coefficient.

An example of how the Fourier-coefficient calculator 61 specifically calculates a value of the first-order Fourier coefficient for each of the U-, V-, and W-phase currents Iu, Iv, and Iw is described in detail in U.S. patent application Ser. No. 14/095,987, whose applicant is the same as this application, filed on Dec. 3, 2013 corresponding to Japanese Patent Applications 2012-264210 and 2013-050474. The disclosure of the U.S. Patent Application is incorporated entirely herein by reference.

Specifically, the US Patent Application discloses a first specific calculation procedure, i.e. a first specific logical calculation algorithm, which can be carried out by the Fourier-coefficient calculator 61. The first specific calculation procedure is designed to calculate values of the first-order components of at least two-phase currents using the Fourier coefficients, and transforms the calculated values of the first-order components of the at least two-phase currents to d- and q-axis current values.

Specifically, the first specific calculation procedure applied to the second pattern calculates the Fourier coefficients $a_v$ and $b_v$ for the V-phase current Iv based on the aforementioned equations [5.1] and [5.2].

Thereafter, the first specific calculation procedure calculates a first-order component of the V-phase current Iv, which corresponds to a first-order component of the Fourier series expansion of the V-phase current Iv, in accordance with the following phase-current recalculation equation [7]:

$$\hat{I}_v a_v \cos\theta + b_v \sin\theta \qquad [7]$$

where $\hat{I}_v$ to which the hat symbol is attached represents the first-order component of the V-phase current Iv.

Delaying the phase of the first-order component $\hat{I}_v$ of the V-phase current Iv by 120°, i.e. ⅓ electric period, using the following equation [8A] obtains a first-order component of the W-phase current Iw:

$$\hat{I}_{w\_est} = a_v \cos(\theta+120°) + b_v \sin(\theta+120°) \qquad [8A]$$

In the equation [8A], $\hat{I}_{w\_est}$ represents an estimated value of the first-order component of the W-phase current Iw.

Figure 6A:
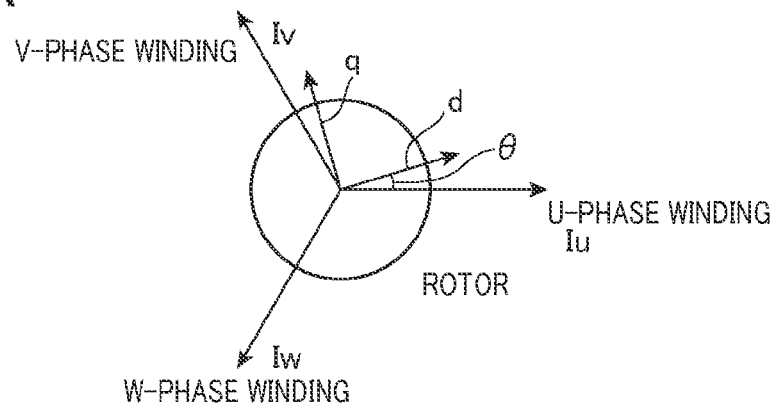
FIG. 6A is a view schematically illustrating a relationship between one set of three-phase windings of a stator of the AC motor and a d-q coordinate system of a rotor of the AC motor.
Figure 6B:
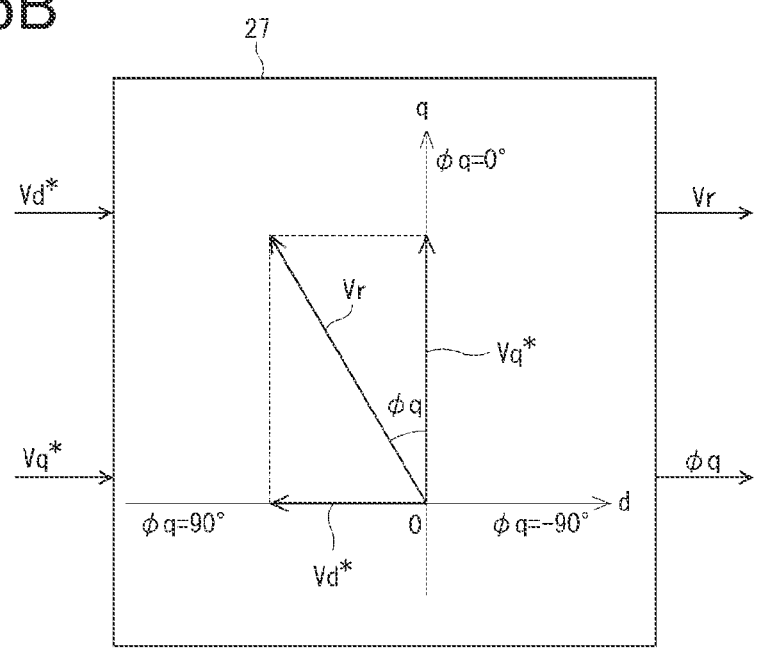
FIG. 6B is a block diagram schematically illustrating an example of the detailed structure of a rϕ converter illustrated in FIG. 5.

The relationship between a three-phase coordinate system (U, V, W) based on the U-, V-, and W-phase windings of the stator and the d-q coordinate system of the rotor is defined as illustrated in FIG. 6A.

Equations for transforming three-phase currents Iu, Iv, and Iw to the d- and q-axis Id and Iq currents are expressed as the following equation [8B] (see FIG. 6A):

$$\begin{bmatrix} I_d \\ I_q \end{bmatrix} = \sqrt{\frac{2}{3}} \begin{bmatrix} \cos\theta & \cos\left(\theta-\frac{2}{3}\pi\right) & \cos\left(\theta+\frac{2}{3}\pi\right) \\ -\sin\theta & -\sin\left(\theta-\frac{2}{3}\pi\right) & -\sin\left(\theta+\frac{2}{3}\pi\right) \end{bmatrix} \begin{bmatrix} I_u \\ I_v \\ I_w \end{bmatrix} \qquad [8B]$$

Thus, transformation of the first-order component $\hat{I}_v$ of the V-phase current Iv and the estimated value $\hat{I}_{w\_est}$ of the first-order component of the W-phase current Iw to a d-axis current value Id and a q-axis current value Iq using the following equation [9] results in a current vector (Id, Iq) being calculated:

$$\begin{bmatrix} I_d \\ I_q \end{bmatrix} = \sqrt{\frac{2}{3}} \begin{bmatrix} \cos\theta & \cos\left(\theta-\frac{2}{3}\pi\right) & \cos\left(\theta+\frac{2}{3}\pi\right) \\ -\sin\theta & -\sin\left(\theta-\frac{2}{3}\pi\right) & -\sin\left(\theta+\frac{2}{3}\pi\right) \end{bmatrix} \begin{bmatrix} -\hat{I}_v - \hat{I}_{w\_est} \\ \hat{I}_v \\ \hat{I}_{w\_est} \end{bmatrix} \qquad [9]$$

Specific examples of how to calculate the equations [5.1] and [5.2], which are disclosed in the US Patent Application. For example, the integral calculation in each of the equations [5.1] and [5. 2] is replaced with summation (E) of the limited number of measured values of the V-phase current Iv.

For example, one electric-angle period from 0° to 360° inclusive is set to the integral interval, and dividing one electric-angle period from 0° to 360° inclusive by N obtains N integral angles. For example, a measured value of the V-phase current Iv is sampled from the current sensor 17 each time the rotational electric angle θ of the rotor of the AC motor 2 changes to one of the N integral angles, so that summation of the sampled measured values of the V-phase current Iv is performed. That is, each of the N integral angles serves as a timing to add a corresponding measured value of the V-phase current Iv to a previously obtained summation.

Because the rotational electric angle θ of the rotor of the AC motor 2, which is included in the equations [7] to [9], changes over time, the equations [7] to [9] using the rotational electric angle θ may result in an increase of the amount of calculations, i.e. calculation processing load, required to calculate the current vector (Id, Iq).

In view of such a circumstance, the controller 201, i.e. the current-vector calculator 65, according to the first embodiment is configured to perform a second specific calculation procedure, i.e. a second specific logical calculation algorithm, for calculating the d- and q-axis current values Id and Iq based on the Fourier coefficients calculated by the Fourier-coefficient calculator 61.

Next, the second specific calculation procedure carried out by the controller 201 will be described hereinafter.

Phase-current recalculation equations for calculating the first-order components of the three-phase currents Iu, Iv, and Iw based on the calculated Fourier coefficients are expressed as the following equations [10]:

$$\begin{bmatrix} I_u \\ I_v \\ I_w \end{bmatrix} = \begin{bmatrix} a_u\cos\theta + b_u\sin\theta \\ a_v\cos\theta + b_v\sin\theta \\ a_w\cos\theta + b_w\sin\theta \end{bmatrix} \qquad [10]$$

A two-phase to three-phase conversion equation for converting the d- and q-axis Id and Iq currents to the three-phase currents Iu, Iv, and Iw is expressed as the following equation [11A]:

$$\begin{bmatrix} I_u \\ I_v \\ I_w \end{bmatrix} = \sqrt{\frac{2}{3}} \begin{bmatrix} \cos\theta & -\sin\theta \\ \cos\left(\theta-\frac{2}{3}\pi\right) & -\sin\left(\theta-\frac{2}{3}\pi\right) \\ \cos\left(\theta+\frac{2}{3}\pi\right) & -\sin\left(\theta+\frac{2}{3}\pi\right) \end{bmatrix} \begin{bmatrix} I_d \\ I_q \end{bmatrix} \qquad [11a]$$

The equation [11A] is transformed to the following equation [11B] in accordance with the addition theorem of trigonometric functions:

$$\begin{bmatrix} I_u \\ I_v \\ I_w \end{bmatrix} = \qquad [11b]$$

$$\sqrt{\frac{2}{3}} \begin{bmatrix} I_d\cos\theta - I_q\sin\theta \\ \left(I_d\cos\frac{2}{3}\pi + I_q\sin\frac{2}{3}\pi\right)\cos\theta + \left(I_d\sin\frac{2}{3}\pi - I_q\cos\frac{2}{3}\pi\right)\sin\theta \\ \left(I_d\cos\frac{2}{3}\pi - I_q\sin\frac{2}{3}\pi\right)\cos\theta - \left(I_d\sin\frac{2}{3}\pi - I_q\cos\frac{2}{3}\pi\right)\sin\theta \end{bmatrix}$$

When the equation [11B] expresses the first-order components of the three-phase currents Iu, Iv, and Iw, the coefficients of cosine functions and sine functions included in the equations [10] and those of corresponding cosine functions and sine functions included in the equation [11B] should be equal to each other. Thus, the following equations for each phase are derived from the relationship between the equations [10] and [11B].

For U phase, the following equation [12] is derived from the relationship between the equations [10] and [11B]:

$$I_u = a_u\cos\theta + b_u\sin\theta = \sqrt{\frac{2}{3}} I_d\cos\theta - \sqrt{\frac{2}{3}} I_q\sin\theta \qquad [12]$$

Because the coefficients of the cosine function and sine function of the middle part in the equation [12] should be respectively equal to those of the cosine function and sine function of the right part in the equation [12], the following equations [13.1], [13.2], [14.1], and [14.2] are obtained:

$$\begin{cases} a_u = \sqrt{\frac{2}{3}} I_d \end{cases} \quad [13.1]$$

$$\begin{cases} b_u = -\sqrt{\frac{2}{3}} I_q \end{cases} \quad [13.2]$$

$$\begin{cases} I_d = \sqrt{\frac{3}{2}} a_u \end{cases} \quad [14.1]$$

$$\begin{cases} I_q = -\sqrt{\frac{3}{2}} b_u \end{cases} \quad [14.2]$$

For V phase, the following equation [15] is derived from the relationship between the equations [10] and [11B]:

$$I_v = a_v \cos\theta + b_v \sin\theta \quad [15]$$

$$= \sqrt{\frac{2}{3}}\left(I_d \cos\frac{2}{3}\pi + I_q \sin\frac{2}{3}\pi\right)\cos\theta +$$

$$\sqrt{\frac{2}{3}}\left(I_d \sin\frac{2}{3}\pi - I_q \cos\frac{2}{3}\pi\right)\sin\theta$$

Because the coefficients of the cosine function and sine function of the middle part in the equation [15] should be respectively equal to those of the cosine function and sine function of the right part in the equation [15], the following equations [16.1], [16.2], [17.1], and [17.2] are obtained:

$$\begin{cases} a_v = \sqrt{\frac{2}{3}}\left(I_d \cos\frac{2}{3}\pi + I_q \sin\frac{2}{3}\pi\right) = \frac{1}{2}\sqrt{\frac{2}{3}} I_d + \frac{\sqrt{2}}{2} I_q \end{cases} \quad [16.1]$$

$$\begin{cases} b_v = -\sqrt{\frac{2}{3}}\left(I_d \sin\frac{2}{3}\pi - I_q \cos\frac{2}{3}\pi\right) = \frac{\sqrt{2}}{2} I_d + \frac{1}{2}\sqrt{\frac{2}{3}} I_q \end{cases} \quad [16.2]$$

$$\begin{cases} I_d = -\frac{1}{2}\sqrt{\frac{3}{2}} a_v + \frac{3}{2\sqrt{2}} b_v \end{cases} \quad [17.1]$$

$$\begin{cases} I_q = \frac{3}{2\sqrt{2}} a_v + \frac{1}{2}\sqrt{\frac{3}{2}} b_v \end{cases} \quad [17.2]$$

For W phase, the following equation [18] is derived from the relationship between the equations [10] and [11B]:

$$I_w = a_w \cos\theta + b_w \sin\theta \quad [18]$$

$$= \sqrt{\frac{2}{3}}\left(I_d \cos\frac{2}{3}\pi - I_q \sin\frac{2}{3}\pi\right)\cos\theta -$$

$$\sqrt{\frac{2}{3}}\left(I_d \sin\frac{2}{3}\pi + I_q \cos\frac{2}{3}\pi\right)\sin\theta$$

Because the coefficients of the cosine function and sine function of the middle part in the equation [18] should be respectively equal to those of the cosine function and sine function of the right part in the equation [18], the following equations [19.1], [19.2], [19.1], and [19.2] are obtained:

$$\begin{cases} a_w = \sqrt{\frac{2}{3}}\left(I_d \cos\frac{2}{3}\pi - I_q \sin\frac{2}{3}\pi\right) = -\frac{1}{2}\sqrt{\frac{2}{3}} I_d - \frac{\sqrt{2}}{2} I_q \end{cases} \quad [19.1]$$

$$\begin{cases} b_w = -\sqrt{\frac{2}{3}}\left(I_d \sin\frac{2}{3}\pi + I_q \cos\frac{2}{3}\pi\right) = -\frac{\sqrt{2}}{2} I_d + \frac{1}{2}\sqrt{\frac{2}{3}} I_q \end{cases} \quad [19.2]$$

$$\begin{cases} I_d = -\frac{1}{2}\sqrt{\frac{3}{2}} a_w - \frac{3}{2\sqrt{2}} b_w \end{cases} \quad [20.1]$$

$$\begin{cases} I_q = -\frac{3}{2\sqrt{2}} a_w + \frac{1}{2}\sqrt{\frac{3}{2}} b_w \end{cases} \quad [20.2]$$

The derived equation [14.1] shows that the sum of the Fourier coefficient $a_u$ and the Fourier coefficient $b_u$ of the U-phase current Iu, which have been respectively multiplied by temporally-invariant constants, such as $$\sqrt{\frac{3}{2}}$$

and 0, calculates the d-current Id of the current vector.

The derived equation [14.2] shows that the sum of the Fourier coefficient $a_u$ and the Fourier coefficient $b_u$ of the U-phase current Iu, have been respectively multiplied by temporally-invariant constants, such as 0 and $$-\sqrt{\frac{3}{2}},$$

calculates the q-current Iq of the current vector.

Similarly, the derived equation [17.1] shows that the sum of the Fourier coefficient $a_v$ and the Fourier coefficient $b_v$ of the V-phase current Ivt, which have been respectively multiplied by temporally-invariant constants, such as $$-\frac{1}{2}\sqrt{\frac{3}{2}} \text{ and } \frac{3}{2\sqrt{2}},$$

calculates the d-axis current Id of the current vector.

The derived equation [17.2] shows that the sum of the Fourier coefficient $a_v$ and the Fourier coefficient $b_v$ of the V-phase current Iv, which have been respectively multiplied by temporally-invariant constants, such as $$\frac{3}{2\sqrt{2}} \text{ and } \frac{1}{2}\sqrt{\frac{3}{2}},$$

calculates the q-axis current Iq of the current vector.

In addition, the derived equation [20.1] shows that the sum of the Fourier coefficient $a_w$ and the Fourier coefficient $b_w$ of the W-phase current Iw, which have been respectively multi- plied by temporally-invariant constants, such as $$-\frac{1}{2}\sqrt{\frac{3}{2}} \quad \text{and} \quad -\frac{3}{2\sqrt{2}},$$

calculates the d-axis current Id of the current vector.

The derived equation [20.2] shows that the sum of the Fourier coefficient $a_v$ and the Fourier coefficient $b_v$ of the V-phase current Iv, which have been respectively multiplied by temporally-invariant constants, such as $$-\frac{3}{2\sqrt{2}} \quad \text{and} \quad \frac{1}{2}\sqrt{\frac{3}{2}},$$

calculates the q-axis current Iq of the current vector.

Specifically, the controller 201, i.e. the current-vector calculator 65, according to the first embodiment is configured to perform the second specific calculation procedure using at least one of the first pair of the equations [14.1] and [14.2], the second pair of the equations [17.1] and [17.2], and the third pair of the equations [20.1] and [20.2].

This makes it possible to calculate the current vector (Id, Iq) directly from the Fourier coefficients for at least one of the three-phase currents without using the first specific calculation procedure; the first specific calculation procedure calculates first-order components of at least two-phase currents using the Fourier coefficients, and transforms the first-order components of the at least two-phase currents to d- and q-axis current values.

Referring to FIG. 5, as described above, the Fourier-coefficient calculator 61 calculates the Fourier coefficients $a_v$ and $b_v$ for the V-phase current Iv using the equations [5.1] and [5.2]. For example, as described above, the Fourier-coefficient calculator 61 calculates the summation (E) of measured values of the V-phase current Iv that are sequentially sampled by the current sensor 17 according to sequential change of the rotational electric angle θ. The present disclosure is however not limited to the calculation. Specifically, the Fourier-coefficient calculator 61 can calculate the summation (E) of measured values of the V-phase current Iv that are sequentially sampled by the current sensor 17 according to sequential change of a phase angle (θ+φq) of the command voltage vector.

Then, the current-vector calculator 65 calculates, based on the calculated Fourier coefficients $a_v$ and $b_v$, the current vector (Id, Iq) using the equations [17.1] and [17.2].

As described above, the control apparatus 10 according to the first embodiment is configured to (1) Extract a first-order component from at least one phase current, thus eliminating a zeroth order component and higher-order components from the at least one phase current (2) Calculate the Fourier coefficients of the extracted first-order component of at least one phase current using Fourier series expansion (3) Calculate, based on the calculated Fourier coefficients, a current vector consisting of a d-axis current value Id and a q-axis current value Iq (4) Feed back the d- and q-axis current values Id and Iq from the AC motor 2 to the current-feedback control.

This configuration makes it possible for the current-feedback control to obtain command duties Du, Dv, and Dw for the respective three-phases while no higher-order components are superimposed on the command duties Du, Dv, and Dw. This reduces noise due to the on-off operations of the switching elements S*# of the inverter 12. Particularly, while driving the inverter 12 in the over-modulation mode, the controller 20 efficiently prevents harmonics from being contained in at least one phase current.

This configuration also eliminates the zeroth order component from the at least one phase current, thus preventing adverse effects of phase-current offset from each of the d- and q-axis current values Id and Iq fed back to the current-feedback control. This suppresses torque variations and power fluctuations of the AC motor 2.

Particularly, when the motor drive system 1 is installed in an electromotive vehicle, such as a hybrid vehicle or an electric vehicle, the control apparatus 10 according to the first embodiment, which offers noise reduction, torque stability, and power stability, satisfies driver's high requirements for quietness and comfort drivability.

Additionally, the control apparatus 10 is configured to (1) Multiply each of the Fourier coefficients of the extracted first-order component of at least one phase current by a corresponding temporally-invariant constant (2) Calculate the first sum of the Fourier coefficients, to which corresponding temporally-invariant constants have been respectively multiplied, thus calculating the d-axis current value Id of the current vector (3) Calculate the second sum of the Fourier coefficients, to which corresponding temporally-invariant constants have been respectively multiplied, thus calculating the q-axis current value Iq of the current vector, the current vector (Id, Iq) being fed back to the current-feedback control.

This configuration eliminates the need to calculate values of the first-order components of at least two-phase currents, thus reducing the amount of calculations, i.e. calculation processing load, required to calculate the current vector (Id, Iq).

Second Embodiment

Figure 7:
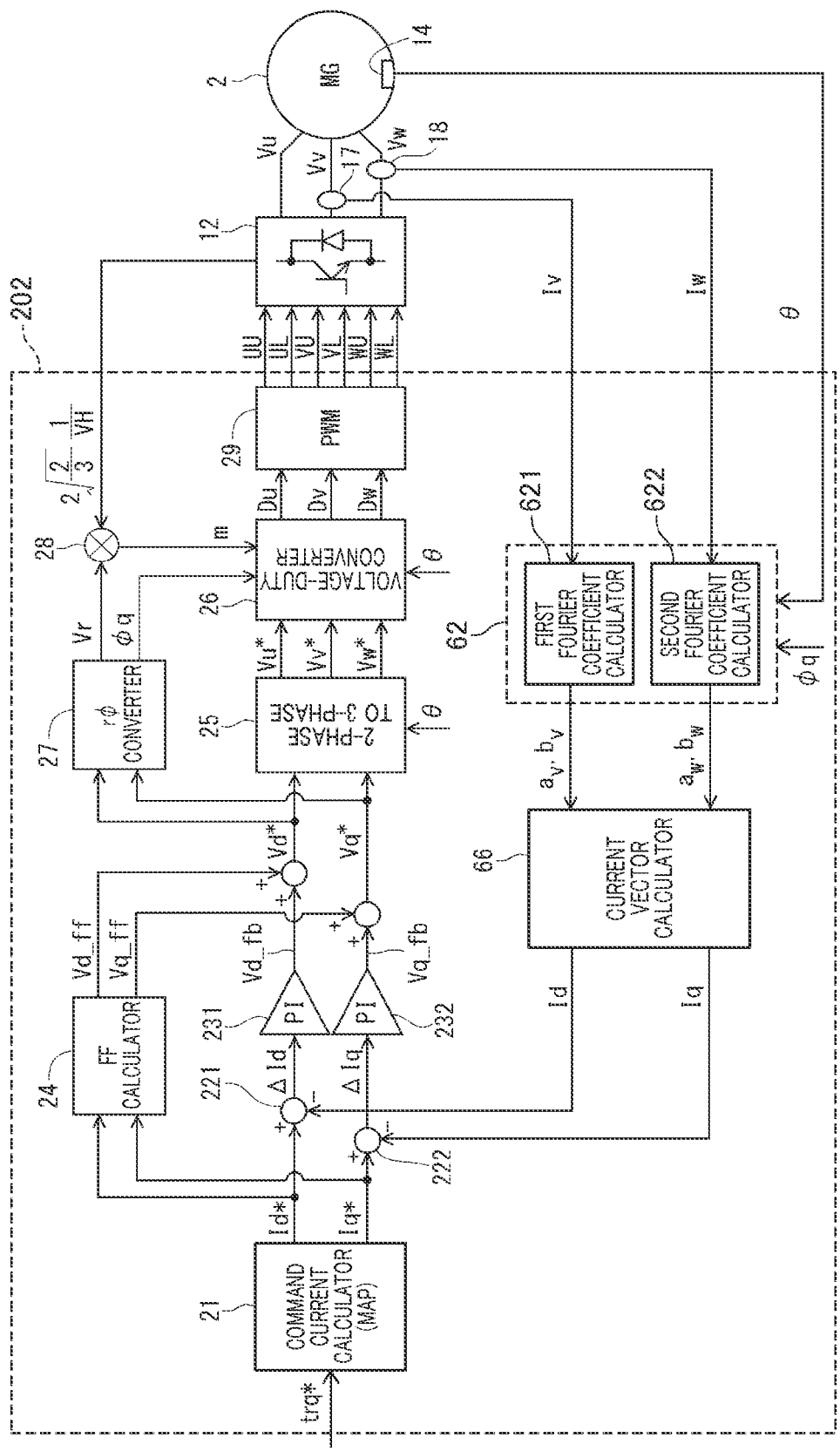
FIG. 7 is a schematic functional block diagram of a controller of the control apparatus according to the second embodiment.

Next, the control apparatus 10 equipped with the controller 202 according to the second embodiment will be described hereinafter with reference to FIG. 7. The control apparatus 10 according to the second embodiment is designed based on the first pattern such that current sensors 17 and 18 are provided for, for example, the respective V- and W-phase stator windings of the AC motor 2 (see FIG. 7). Of course, the following structure and operations of the controller 202 can be applied to the controller 202 when the current sensors 17 and 18 are provided for the respective U- and V-phase stator windings or the respective U- and W-phase stator windings of the AC motor 2.

The structure and/or functions of the controller 202 according to the second embodiment are different from the controller 201 according to the first embodiment by the following points. So, the different points will be mainly described hereinafter.

The U.S. patent application Ser. No. 14/095,987 discloses a third specific calculation procedure, i.e. a third specific logical calculation algorithm.

The third specific calculation procedure applied to the second pattern calculates the Fourier coefficients $a_v$ and $b_v$ for the V-phase current Iv based on the aforementioned equations [5.1] and [5.2].

Thereafter, the third specific calculation procedure calculates a first-order component of the V-phase current Iv, which corresponds to a first-order component of the Fourier series expansion of the V-phase current Iv, in accordance with the aforementioned phase-current recalculation equation [7].

Similarly, the third specific calculation procedure calculates the Fourier coefficients $a_w$ and $b_w$ for the W-phase current Iw based on the aforementioned equations [6.1] and [6.2].

Thereafter, the third specific calculation procedure calculates a first-order component of the W-phase current Iw, which corresponds to a first-order component of the Fourier series expansion of the W-phase current Iw, in accordance with the following phase-current recalculation equation [21]:

$$\hat{I}_w = a_w \cos\theta + b_w \sin\theta \qquad [21]$$

Next, transformation of the first-order component of the V-phase current Iv and the the first-order component of the W-phase current Iw to a d-axis current value Id and a q-axis current value Iq using the following equation [22] results in a current vector (Id, Iq) being calculated:

$$\begin{bmatrix} I_d \\ I_q \end{bmatrix} = \sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} -\hat{I}_v - \hat{I}_w \\ \hat{I}_v \\ \hat{I}_w \end{bmatrix} \qquad [22]$$

Like the first embodiment, the equations [7], [21], and [22] using the rotational electric angle θ may result in an increase of the amount of calculations, i.e. calculation processing load, required to calculate the current vector (Id, Iq).

In contrast, the controller 202 according to the second embodiment includes a Fourier coefficient calculator 62 provided with a first Fourier-coefficient calculator 621 and a second Fourier-coefficient calculator 622.

The first Fourier-coefficient calculator 621 is configured to calculate the Fourier coefficients $a_v$ and $b_v$ for the V-phase current Iv based on the aforementioned equations [5.1] and [5.2]. Similarly, the second Fourier-coefficient calculator 622 is configured to calculate the Fourier coefficients $a_w$ and $b_w$ for the W-phase current Iw based on the aforementioned equations [6.1] and [6.2].

A current-vector calculator 66 of the controller 202 is configured to calculate (1) A first candidate set of first d- and q-axis current values using the Fourier coefficients $a_v$ and $b_v$, and the equations [17.1] and [17.2]

(2) A second candidate set of second d- and q-axis current values using the Fourier coefficients $a_v$ and $b_v$, and the equations [20.1] and [20.2]

(3) An average of the first d-axis current value of the first candidate set and the second d-axis current value of the second candidate set and an average of the first q-axis current value of the first set and the second q-axis current value of the second set (4) A current vector consisting of the average of the first and second d-axis current values as a d-axis current value Id and the average of the first and second q-axis current values as a q-axis current Iq.

Specifically, the calculated current vector (Id, Iq) is expressed as the following equations [23.1] and [23.2]:

$$\begin{cases} I_d = -\frac{1}{4}\sqrt{\frac{3}{2}} a_v + \frac{3}{4\sqrt{2}} b_v - \frac{1}{4}\sqrt{\frac{3}{2}} a_w - \frac{3}{4\sqrt{2}} b_w & [23.1] \\ I_q = \frac{3}{4\sqrt{2}} a_v + \frac{1}{4}\sqrt{\frac{3}{2}} b_v - \frac{3}{4\sqrt{2}} a_w + \frac{1}{4}\sqrt{\frac{3}{2}} b_w & [23.2] \end{cases}$$

As described above, the control apparatus 10 according to the second embodiment is configured to calculate the current vector (Id, Iq) using information about the two-phase currents measured by the respective current sensors 17 and 18. This configuration achieves, in addition to the same advantages as those achieved in the first embodiment, an advantage of improving the calculation accuracy of the current vector (Id, Iq) as compared with the calculation accuracy for the control apparatus 10 according to the first embodiment, which uses information about one phase current measured by the single current sensor 17. This configuration also achieves an advantage of reducing adverse effects due to errors in the current values measured by the current sensors 17 and 18 as compared with the controller 203 according to the third embodiment described hereinafter.

Third Embodiment

Figure 8:
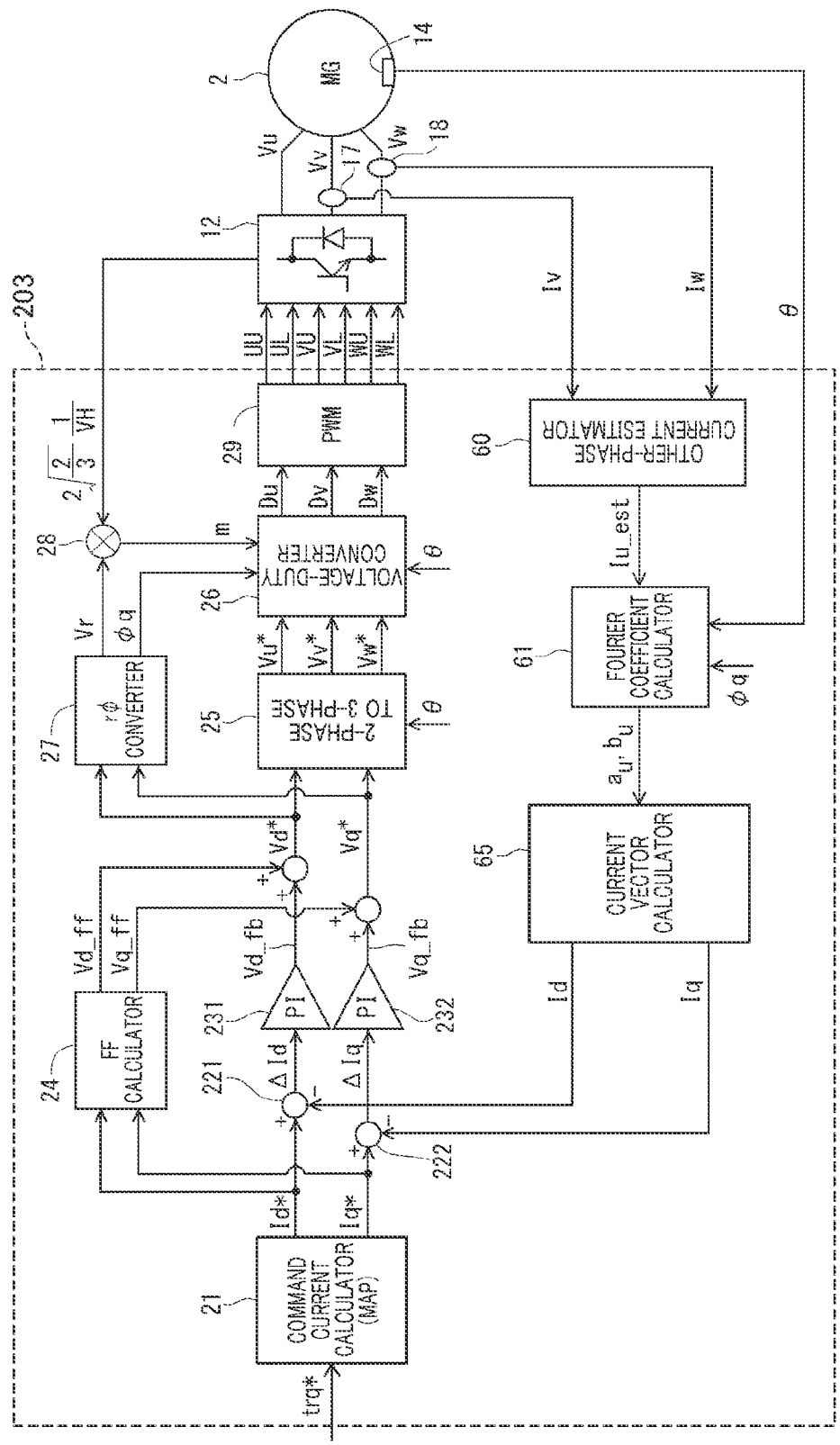
FIG. 8 is a schematic functional block diagram of a controller of the control apparatus according to the third embodiment.

Next, the control apparatus 10 equipped with the controller 203 according to the third embodiment will be described hereinafter with reference to FIG. 8. The control apparatus 10 according to the third embodiment is designed based on the first pattern such that current sensors 17 and 18 are provided for, for example, the respective V- and W-phase stator windings of the AC motor 2 (see FIG. 8).

The structure and/or functions of the controller 203 according to the third embodiment are different from the controller 202 according to the second embodiment by the following points. So, the different points will be mainly described hereinafter.

The controller 203 is provided with an other-phase current estimator 60 in addition to the Fourier-coefficient calculator 61 and the current-vector calculator 65; the Fourier-coefficient calculator 61 and the current-vector calculator 65 are substantially identical to those according to the first embodiment.

The other-phase current estimator 60 is configured to estimate an other-phase current, i.e. a U-phase current Iu, based on two-phase currents, i.e. the V- and W-phase currents Iv and Iw, measured by the respective current sensors 17 and 18 in accordance with Kirchhoffs law.

Specifically, the other-phase current estimator 60 estimates a value $I_{w\_est}$ of the U-phase current Iu, based on the measured values of the V- and W-phase currents Iv and Iw in accordance with the fact that the sum of the three-phase currents is always zero on Kirchhoffs law.

In the third embodiment, the Fourier-coefficient calculator 61 calculates the Fourier coefficients of the U-phase current Iu using the following equations:

$$a_u = \frac{1}{\pi} \int_{-\pi}^{\pi} (-I_v(\theta) - I_w(\theta))\cos\theta \, d\theta \qquad [24.1]$$

$$b_u = \frac{1}{\pi} \int_{-\pi}^{\pi} (-I_v(\theta) - I_w(\theta))\sin\theta \, d\theta \qquad [24.2]$$

The current-vector calculator 65 calculates the current vector (Id, Iq) using the aforementioned equations [14.1] and [14.2].

As described above, the control apparatus 10 according to the third embodiment is configured to calculate the current vector (Id, Iq) using information about the two-phase currents measured by the respective current sensors 17 and 18. This configuration achieves, in addition to the same advantages as those achieved in the first embodiment, an advantage of improving the calculation accuracy of the current vector (Id, Iq) as compared with the calculation accuracy for the control apparatus 10 according to the first embodiment, which uses information about one phase current measured by the single current sensor 17. This configuration also achieves an advantage of reducing the amount of calculations as compared with the controller 202 according to the second embodiment described.

Fourth Embodiment

Figure 9:
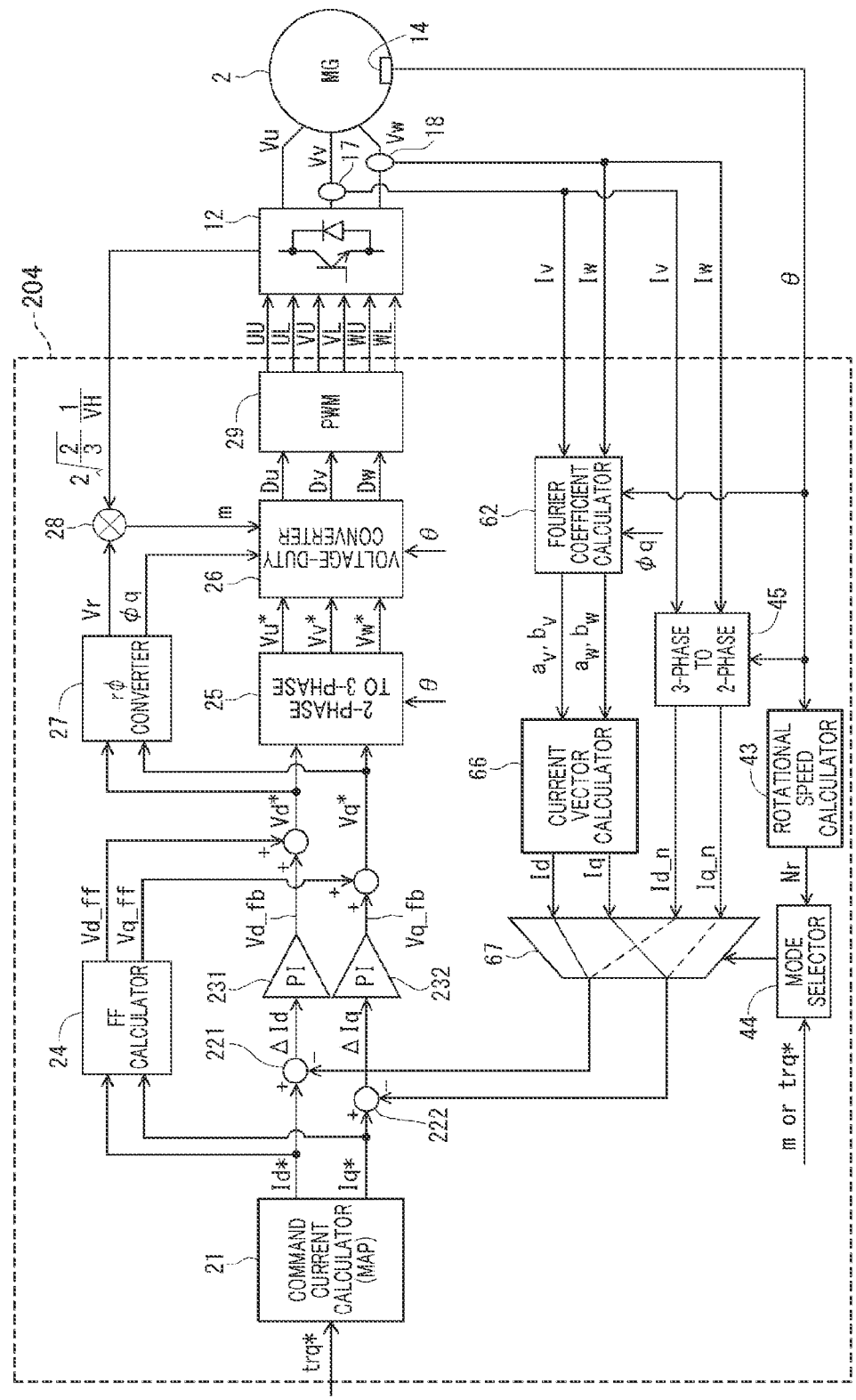
FIG. 9 is a schematic functional block diagram of a controller of the control apparatus according to the fourth embodiment.

Next, the control apparatus 10 equipped with the controller 204 according to the fourth embodiment will be described hereinafter with reference to FIG. 9. The control apparatus 10 according to the fourth embodiment is designed based on the first pattern such that current sensors 17 and 18 are provided for, for example, the respective V- and W-phase stator windings of the AC motor 2 (see FIG. 9).

The structure and/or functions of the controller 204 according to the fourth embodiment are different from the controller 202 according to the second embodiment by the following points. So, the different points will be mainly described hereinafter.

Problems due to superimposition of higher-order components on at least one phase current and/or problems due to phase-current offset become serious as the rotational speed of the AC motor 2 and output torque of the AC motor 2 increase. In other words, when the rotational speed of the AC motor 2 is lying within a low-speed range or the output, i.e. output power or output torque, of the AC motor 2 is lying within a low output region, there is relatively little problem.

Particularly, there may be a case where one electric-angle period of the AC motor 2 used to calculate the Fourier coefficients and the first-order components of at least one phase current may become longer when the rotational speed of the AC motor 2 lies within a low-speed range, resulting in a reduction in the responsivity of the current-feedback control. Thus, in this case, it is preferable the control apparatus 10 does not use Fourier series expansion of at least one phase current measured by a corresponding current sensor.

In view of these circumstances, the controller 204 of the control apparatus 10 according to the fourth embodiment is configured to select one of (1) A first calculation mode that uses Fourier series expansion in calculating a current vector consisting of a d-axis value Id and a q-axis value Iq (2) A second calculation mode that uses three-phase to two-phase conversion without using Fourier series expansion in calculating the current vector consisting of the d-axis value Id and the q-axis value Iq.

The configuration for selecting one of the first calculation mode and the second calculation mode according to the fourth embodiment can be combined to any one of the controllers 201 to 203 according to the first to third embodiments. As described above, the controller 204 according to the fourth embodiment is designed such that the configuration for selecting one of the first calculation mode and the second calculation mode is combined to the controller 202 according to the second embodiment as a typical example.

Specifically, the controller 204 according to the fourth embodiment is provided with a three-phase to two-phase converter 45, a rotational speed calculator 43, a mode selector 44, and a current switching unit 67. The three-phase to two-phase converter 45 is simply illustrated in FIG. 9 as 3-PHASE TO 2-PHASE.

To the three-phase to two-phase converter 45, values of the V- and W-phase currents Iv and Iw measured by the current sensors 17 and 18, and the rotational electric angle $\theta$ of the rotor of the AC motor 2 measured by the rotational angle sensor 14 are input.

Then, the three-phase to two-phase converter 45 converts the values of the V- and W-phase currents Iv and Iw measured by the current sensors 17 and 18, each of which contains a zeroth order component and higher-order components, to d- and q-axis currents using the rotational electric angle $\theta$ and, for example, equation data. For example the three-phase to two-phase converter 45 converts the measured values of the V- and W-phase currents Iv and Iw into values of the d- and q-axis currents using a predetermined equation. The predetermined equation is designed such that, in one of the aforementioned equation [9] or equation [24], the first-order component $\hat{I}_v$ of the V-phase current Iv and the first-order component $\hat{I}_w$ of the W-phase current Iw (or the estimated value $\hat{I}_{w\_est}$ of the first-order component of the W-phase current Iw) are respectively replaced with the V- and W-phase currents Iv and Iw.

The d- and q-axis currents of the current vector obtained by the three-phase to two-phase converter 45 will be referred to as d- and q-axis currents Id_n and Iq_n hereinafter in order to distinguish them from the B- and q-axis currents Id and Iq calculated by the current-vector calculator 66.

The rotational speed calculator 43 is configured to calculate, based on the rotational electric angle $\theta$, the rotational speed Nr, i.e. the number of revolutions, of the rotor of the AC motor 2.

The mode selector 44 is configured to obtain pieces of information about the rotational speed Nr of the rotor of the AC motor 2, and at least one of the request torque trq* from the vehicle controller 9 and the modulation factor m from the multiplier 28. Then, the mode selector 44 is configured to select, based on the obtained pieces of the information, one of the first calculation mode and the second calculation mode as the operation mode of the current switching unit 67.

For example, the mode selector 44 is configured to (1) Determine whether the rotational speed of the AC motor is lower than a predetermined threshold speed and the request torque trq* or the modulation factor m is lower than a corresponding predetermined threshold value (2) Select the first calculation mode when it is determined that the rotational speed of the AC motor is equal to or higher than the predetermined threshold speed, and when it is determined that each of the request torque trq* and the modulation factor m is equal to or higher than the corresponding predetermined threshold value (3) Select the second calculation mode when it is determined that the rotational speed of the AC motor is lower than the predetermined threshold speed, or when it is determined that at least one of the request torque trq* and the modulation factor m is lower than the corresponding predetermined threshold value (4) Output information indicative of the selected one of the first and second calculation modes to the current switching unit 67.

The d- and q-axis currents Id and Iq calculated by the current-vector calculator 66, the d- and q-axis currents d_n and Iq_n obtained by the three-phase to two-phase converter 45, and the information output from the mode selector 44 are output to the current switching unit 67.

Then, the current switching unit 67 is configured to

1. Operate in the first calculation mode to select the d- and q-axis currents Id and Iq calculated by the current-vector calculator 66 to thereby feed back the d- and q-axis currents Id and Iq to the respective first and second subtractors 221 and 222 when the information supplied from the mode selector 44 represents the first calculation mode 2. Operate in the second calculation mode to select the d- and q-axis currents Id_n and Iq_n obtained by the three-phase to two-phase converter 45 to thereby feed back the d- and q-axis currents Id_n and Iq_n to the respective first and second subtractors 221 and 222 when the information supplied from the mode selector 44 represents the second calculation mode.

As described above, the controller 204 according to the fourth embodiment is configured to prevent using of Fourier series expansion in obtaining the current vector when it is determined that the rotational speed of the AC motor 2 lies within a low-speed range lower than the predetermined threshold speed. This prevents a reduction in the responsivity of the current-feedback control.

Note that let us assume a case where the controller 204 is configured such that the configuration for selecting one of the first calculation mode and the second calculation mode is combined to the controller 201 according to the first embodiment. In this case, it is necessary for the three-phase to two-phase converter 45 to estimate, based on one phase current, i.e. a V-phase current Iv measured by the current sensor 17, another phase current.

There are various methods to estimate another phase current based on one phase current, examples of which are disclosed in the following first to fourth Japanese Patent Application Publications 1. No. 2004-159391
2. No. 2008-086139 corresponding to U.S. Pat. No. 7,598,698
3. No. 2013-172592 corresponding to US Patent Application Publication 2013/0214712A1
4. No. 2013-172593 corresponding to US Patent Application Publication 2013/0214713A1.

The disclosures of these publications are incorporated entirely herein by reference.

The first Japanese Patent Publication discloses a method of estimating, based on a measured value of one phase current, an electric angle of a motor, and a command phase angle of a d-q command current vector with respect to the q-axis, another phase current.

The second Japanese Patent Publication discloses a method of estimating another phase current based on a motor-speed command value and a measured or estimated motor speed.

Each of the third and fourth Patent Publications discloses a method of estimating, based on a measured value of one phase current and d- and q-axis command currents Id* and Iq*, another phase current.

The three-phase to two-phase converter 45 is capable of using one of the methods disclosed in the first to fourth Patent Publications to estimate another phase current. Preferably, the three-phase to two-phase converter 45 uses one of the methods disclosed in the third and fourth Patent Publications to estimate another phase current.

Fifth embodiment

Figure 10:
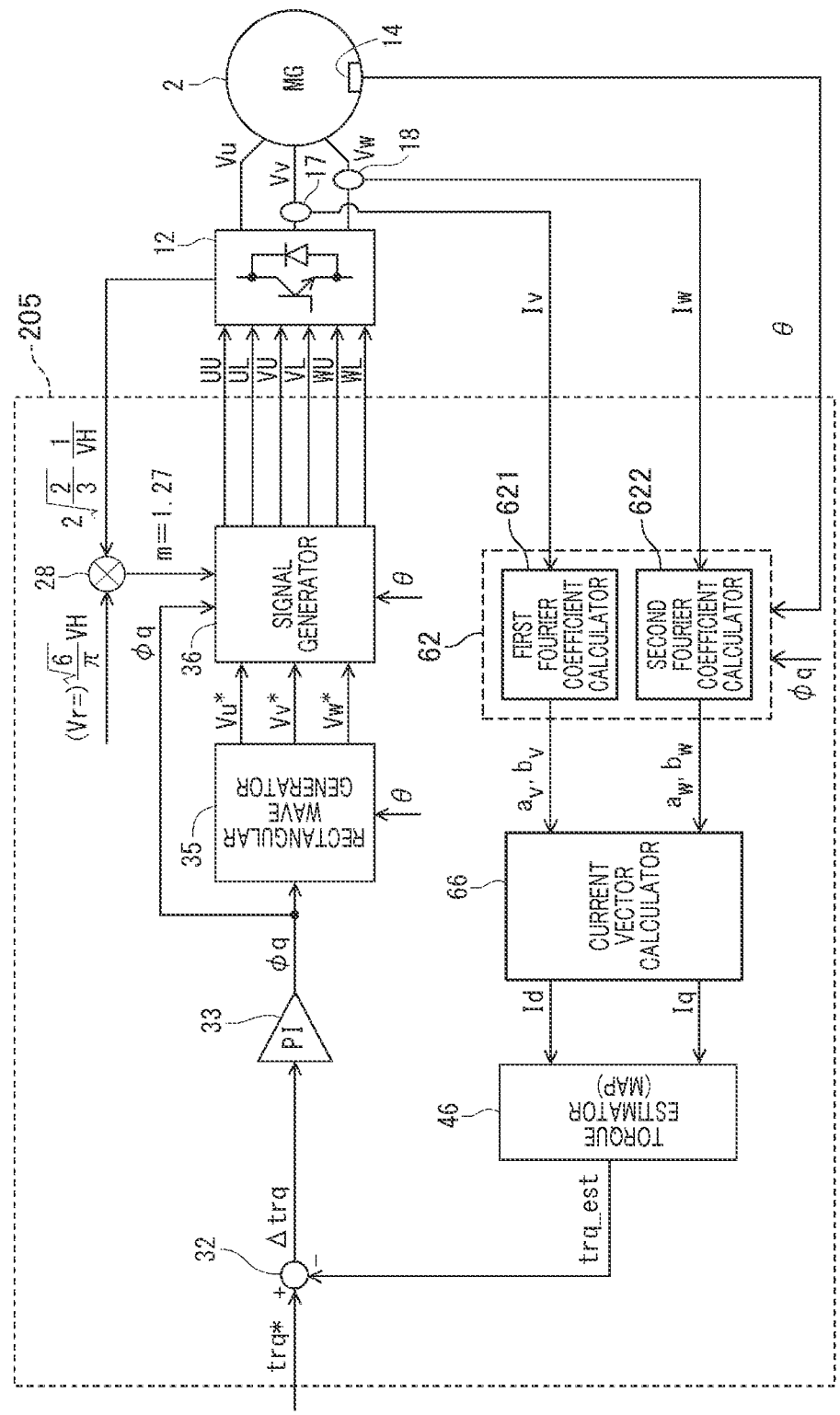
FIG. 10 is a schematic functional block diagram of a controller of the control apparatus according to the fifth embodiment.

Next, the control apparatus 10 equipped with the controller 205 according to the fifth embodiment will be described hereinafter with reference to FIG. 10. The control apparatus 10 according to the fifth embodiment is designed based on the first pattern such that current sensors 17 and 18 are provided for, for example, the respective V- and W-phase stator windings of the AC motor 2 (see FIG. 10).

The controller 205 according to the fifth embodiment is configured to perform the torque-feedback control that drives the inverter 12 in the rectangular control mode. As described above with reference to FIGS. 3 and 4, the controller 205 drives the inverter 12 in the rectangular control mode when higher rotational speed and higher output torque are required for the AC motor 2. As described above, the rectangular control mode is designed to generate a rectangular AC voltage for each phase based on a voltage phase command $\phi q^*$ without using the d-q axis command currents Id* and Iq*.

The configuration for performing the torque-feedback control according to the fifth embodiment can be combined to any one of the controllers 201 to 204 according to the first to fourth embodiments. As described above, the controller 205 according to the fifth embodiment is designed such that the configuration for performing the torque-feedback control is combined to the controller 202 according to the second embodiment as a typical example.

The structure and/or functions of the controller 205 for performing the torque-feedback control are different from the controller 202 for performing the current-feedback control by the following points. So, the different points will be mainly described hereinafter.

The controller 205 includes a torque subtractor 32, a PI operator 33, a rectangular-wave generator 35, a signal generator 36, and a torque estimator 46.

The torque subtractor 32 is operative to subtract a torque estimated value trq_est from the request torque trq* supplied from the vehicle controller 9 to thereby calculate a torque deviation $\Delta$trq between the estimated torque trq_est and the request torque trq*.

The PI operator 33 is operative to perform a PI operation using the torque deviation $\Delta$trq as input data, and a proportional gain term and an integral gain term of a PI feedback control algorithm (PI algorithm), thus calculating the voltage phase command $\phi q^*$ such that the torque deviation $\Delta$trq converges to zero. This causes the estimated torque trq_est to follow the request torque trq*.

The rectangular-wave generator 35 is operative to generate, based on the voltage phase command $\phi q^*$ and the electric rotational angle $\theta$, rectangular U-, V-, and W-phase voltage commands Vu*, Vv*, and Vw*, i.e. U-, V-, and W-phase voltage command pulses Vu*, Vv*, and Vw*.

The signal generator 36 is operative to generate, based on the voltage phase command $\phi q^*$, the electric rotational angle $\theta$, the modulation factor m set to 1.27, and the three-phase voltage commands Vu*, Vv*, and Vw*, drive signals, i.e. drive pulses, UU, UL, VU, VL, WU, and WL for the respective switching elements Sup, Sun, Svp, Svn, Swp, and Swn of the inverter 12.

That is, the controller 205 is operative to perform on-off operations of the switching elements Sup, Sun, Svp, Svn, Swp, and Swn of the inverter 12 based on the respective drive pulses UU, UL, VU, VL, WU, and WL, thus generating three-phase voltages Vu, Vv, and Vw as output of the inverter 12. The three-phase voltages Vu, Vv, and Vw are applied to the AC motor 2, so that the AC motor 2 is driven based on the three-phase voltages Vu, Vv, and Vw to generate torque matching with the value of the request torque trq*.

In the controller 205, the r$\phi$ converter 27 is eliminated, so that the multiplier 28 is operative not to calculate the magnitude Vr based on the command d- and q-axis voltages Vd* and Vq*, but to receive $$\frac{\sqrt{6}}{\pi}VH$$

input thereto as a fixed magnitude Vr. The multiplier 28 is also operative to calculate the modulation factor m in the rectangular control mode in accordance with the following equation [25]:

$$m = \frac{\sqrt{6}}{\pi}VH \times 2\sqrt{\frac{2}{3}}\frac{1}{VH} \approx 1.27 \qquad [25]$$

Like the second embodiment, the first Fourier-coefficient calculator 621 is configured to calculate the Fourier coefficients $a_v$ and $b_v$ for the V-phase current Iv based on the aforementioned equations [5.1] and [5.2]. Similarly, the second Fourier-coefficient calculator 622 is configured to calculate the Fourier coefficients $a_w$ and $b_w$ for the W-phase current Iw based on the aforementioned equations [6.1] and [6.2].

Like the second embodiment, the current-vector calculator 66 is configured to calculate a current vector (Id, Iq) in accordance with the aforementioned equations [23.1] and [23.2].

The torque estimator 46 is operative to obtain the estimated torque trq_est based on the d-axis and q-axis current values Id and Iq input from the current-vector calculator 66.

For example, the torque estimator 46 obtains the estimated torque trq_est using, for example, a map in data-table format, in mathematical expression format, and/or program format. The map includes a function, i.e. correlation, between values of the estimated torque trq_est with respect to pairs of the d- and q-axis current values Idr and Iqr. The torque estimator 46 retrieves a value of the estimated torque trq_est corresponding to a pair of the d- and q-axis current values Id and Iq in the map. Then, the torque estimator 46 feeds back the value of the estimated torque trq_est to the torque subtractor 32.

The rectangular control mode is configured such that the upper- and lower-arm switching elements S# for each phase of the AC motor 2 are complementarily turned on and off for each electric-angle period of the AC motor 2. Thus, the total number of turn-on and turn-off of the switching elements S*# for the AC motor 2 becomes six for each electric-angle period of the AC motor 2, resulting in sixth-order components synchronized with the switching cycles being superimposed on, for example, each phase current flowing in the AC motor 2.

In order to remove the sixth-order components, if low-pass filters were used, the low-pass filters might excessively smooth the current vector (Id, Iq), so that the torque deviation might increase. This might create need to reduce the feedback gain, that is, each of the proportional and integral terms, of the PI operator 33, resulting in reduction of the responsivity of the torque-feedback control.

However, as described above, the control apparatus 10 equipped with the controller 205 according to the fifth embodiment is configured to calculate the current vector (Id, Iq) based on the first-order component of each of the V- and W-phase currents Iv and Iw. This configuration eliminates the sixth-order components from each of the V- and W-phase currents Iv and Iw without using low-pass filters. This therefore achieves, in addition to the same advantages as those achieved in the second embodiment, an advantage of preventing the sixth-order components from being contained in the current vector (Id, Iq) while avoiding reduction in the responsivity of the torque-feedback control.

Note that let us assume a case where the controller 205 is configured such that the configuration for performing the torque-feedback control is combined to the controller 204 according to the first embodiment in which the single current sensor 17 is provided for one phase current.

In this case, it is necessary for the three-phase to two-phase converter 45 to estimate another phase current without using d- and q-axis command currents Id* and Iq*.

There are various methods to estimate another phase current based on one phase current, examples of which are disclosed in the following fifth and sixth Japanese Patent Application Publications 1. No. 2013-172594 corresponding to US Patent Application Publication 2013/0241709A1
2. No. 2013-225991 corresponding to US Patent Application Publication 2013/0278187A1.

The disclosures of these publications are incorporated entirely herein by reference.

The three-phase to two-phase converter 45 is capable of using one of the methods disclosed in the fifth and sixth Patent Publications to estimate another phase current.

Sixth Embodiment

Figure 11:
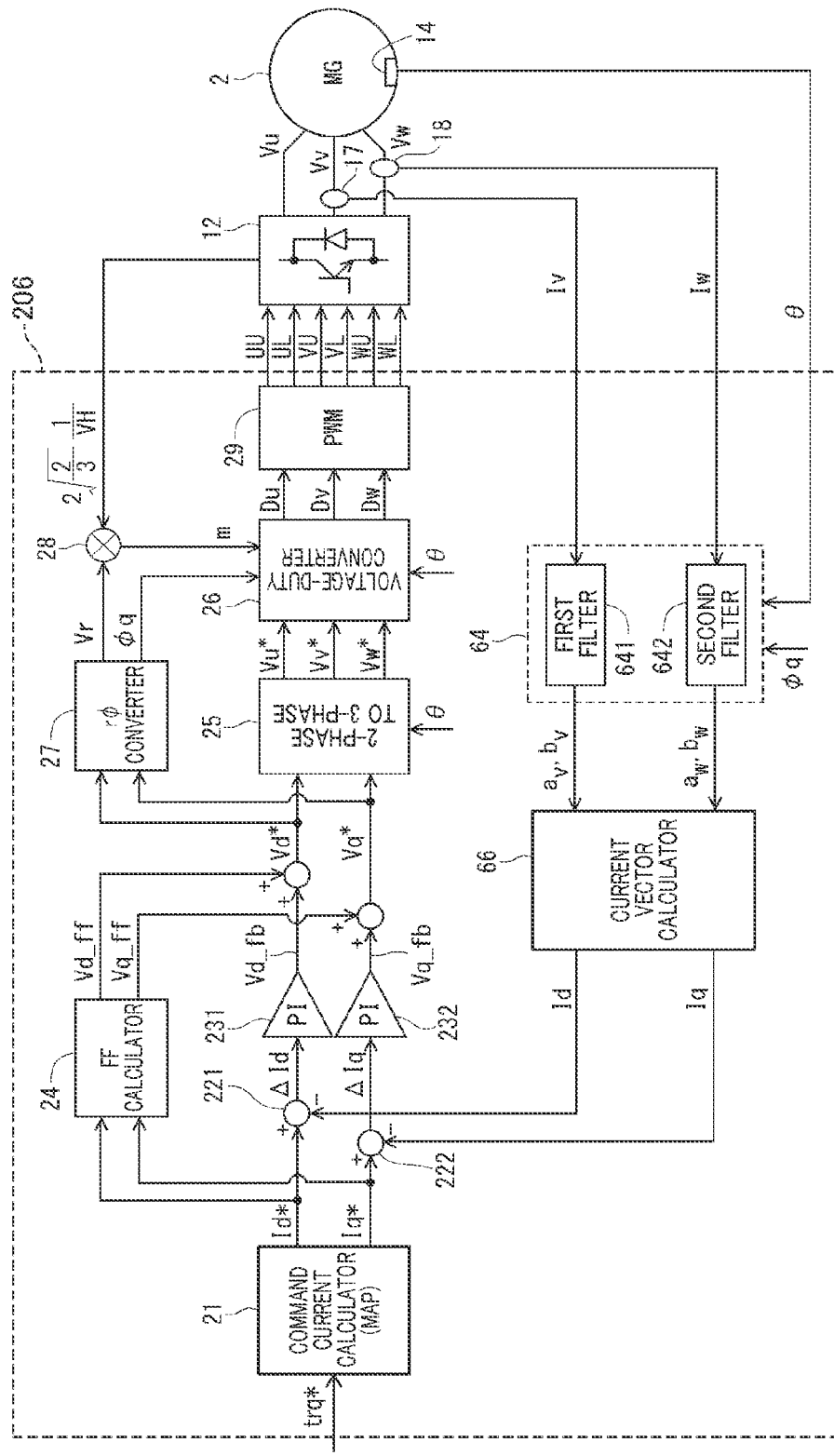
FIG. 11 is a schematic functional block diagram of a controller of the control apparatus according to the sixth embodiment.

Next, the control apparatus 10 equipped with the controller 206 according to the sixth embodiment will be described hereinafter with reference to FIGS. 11 to 13. The control apparatus 10 according to the sixth embodiment is designed based on the first pattern such that current sensors 17 and 18 are provided for, for example, the respective V- and W-phase stator windings of the AC motor 2 (see FIG. 11).

Fourier series expansion as a method for extracting a first-order component from at least one phase component is inherently a filter calculation for emphasizing desired-order waveforms using the following equation [26]

$$\begin{bmatrix}a\\b\end{bmatrix} = \begin{bmatrix}f_{s1} & f_{s2} & \cdots & f_{sn}\\f_{c1} & f_{c2} & \cdots & f_{cn}\end{bmatrix}\begin{bmatrix}I_{u1}\\I_{u2}\\\vdots\\I_{un}\end{bmatrix} \qquad [26]$$

where
1. a represents Fourier coefficients of a cosine function
2. b represents Fourier coefficients of a sine function
3. $f_{s1}$ to $f_{sn}$ represents sine filter coefficients represented as $f_{sk} = \sin(2\pi k/n)$
4. $f_{c1}$ to $f_{cn}$ represents cosine filter coefficients represented as $f_{ck} = \cos(2\pi k/n)$
5. $I_{u1}$ to $I_{un}$ represents measured values of a phase current.

The equation [26] shows autocorrelation of the sine filters and the measured current waveforms, and autocorrelation of the cosine filters and the measured current waveforms. Thus, other emphasizing filters whose waveforms are similar to the respective sine and cosine waveforms of the sine and cosine filters can emphasize desired-order waveforms.

In view of these circumstances, the controller 206 according to the sixth embodiment uses rectangular emphasizing filters in place of the sine and cosine filter coefficients that require many product-sum operations.

As compared with the controller 202 according to the second embodiment, the controller 206 according to the sixth embodiment includes a rectangular emphasizing filter unit 64 in place of the Fourier-coefficient calculator 62. Note that the Fourier-coefficient calculator 62 according to each of the other embodiments can be replaced with the rectangular emphasizing filter unit 64.

Figure 12A:
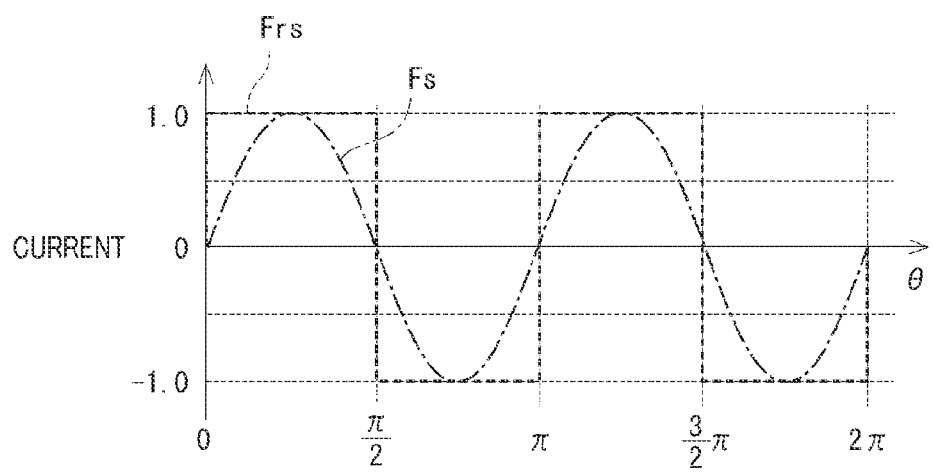
FIG. 12A is a graph schematically illustrating a phase current filtered by a sine filter, and a corresponding phase current filtered by a rectangular sine filter according to the sixth embodiment.
Figure 12B:
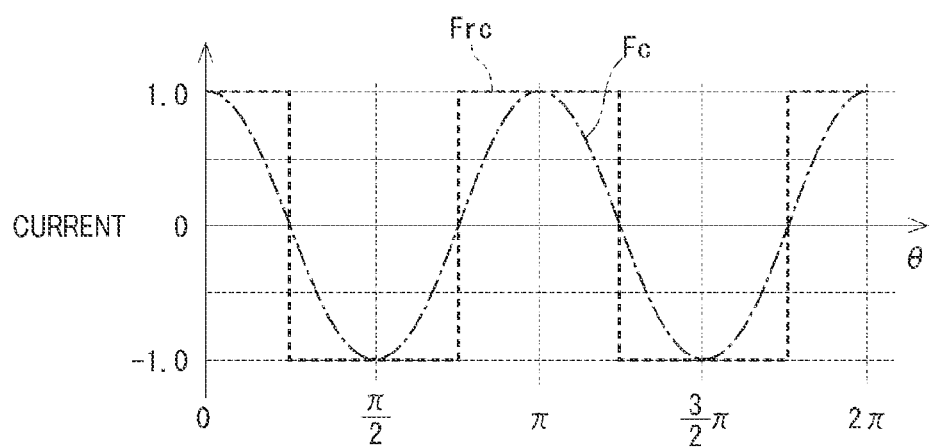
FIG. 12B is a graph schematically illustrating a phase current filtered by a cosine filter, and a corresponding phase current filtered by a rectangular cosine filter according to the sixth embodiment.

FIG. 12A illustrates a phase current filtered by a sine filter, i.e. a sine emphasizing filter, Fs (see a dashed-dotted line), and a corresponding phase current filtered by a rectangular sine filter, i.e. a rectangular emphasizing filter, Frs (see dashed line). FIG. 12B illustrates a phase current filtered by a cosine filter, i.e. a cosine emphasizing filter, Fc (see a dashed-dotted line), and a corresponding phase current filtered by a rectangular cosine filter, i.e. a rectangular emphasizing filter, Fcs (see dashed line). Note that the rectangular sine filter has a periodic rectangular waveform whose amplitude and period match with those of a sine waveform. Similarly, the rectangular cosine filter has a periodic rectangular waveform whose amplitude and period match with those of a cosine waveform.

Specifically, the rectangular emphasizing filter unit 64 includes a first rectangular emphasizing filter unit 641 and a second rectangular emphasizing filter unit 642. The first rectangular emphasizing filter unit 641 and the second rectangular emphasizing filter unit 642 are simply illustrated as FIRST FILTER 641 and SECOND FILTER 642 in FIG. 11.

The first rectangular emphasizing filter unit 641 is configured to emphasize the first-order component of the V-phase current Iv measured by the current sensor 17 using the rectangular sine filter Frs and the rectangular cosine filter Fcs to thereby obtaining the first Fourier coefficients $a_v$ and $b_v$ for the V-phase current Iv.

The second rectangular emphasizing filter unit 642 is configured to emphasize the first-order component of the W-phase current Iw measured by the current sensor 18 using the rectangular sine filter Frs and the rectangular cosine filter Fcs to thereby obtaining the first Fourier coefficients $a_w$ and $b_w$ for the W-phase current Iw.

Figure 13:
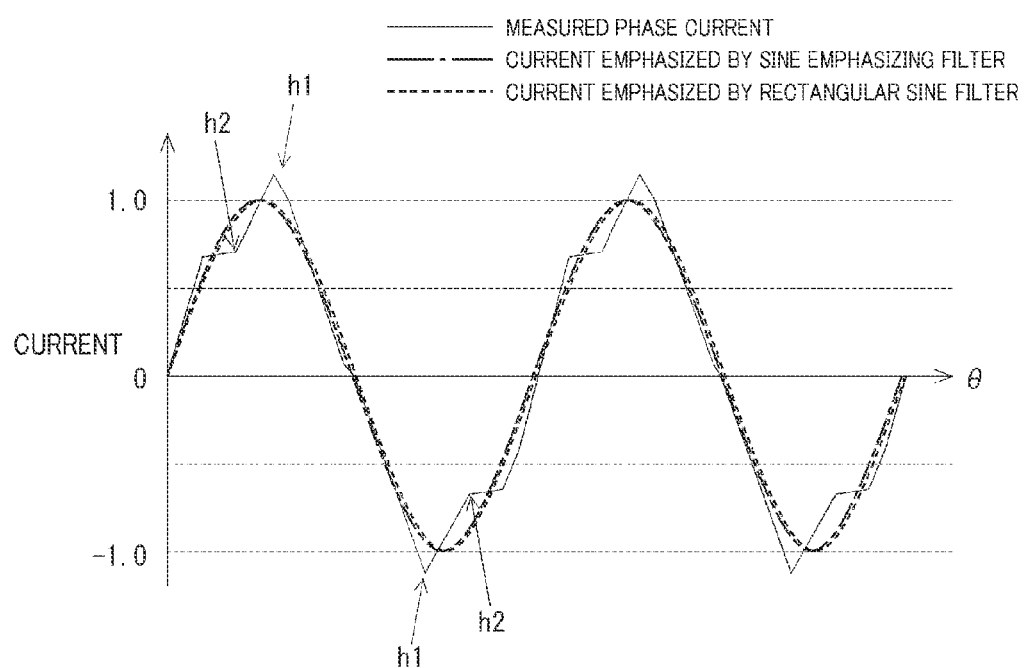
FIG. 13 is a graph schematically illustrating the waveform of a phase current measured by a current sensor, the waveform of a corresponding phase current emphasized by a sine emphasizing filter, and the waveform of a corresponding phase current emphasized by the rectangular sine filter according to the sixth embodiment.

FIG. 13 schematically illustrates (1) The waveform of a phase current measured by the current sensor 17 or 18 (see solid line)

(2) The waveform of a corresponding phase current Iv emphasized by a sine emphasizing filter (see dashed-dotted line)

(3) The waveform of a corresponding phase current emphasized by the rectangular sine filter Frs.

FIG. 13 clearly shows that the waveform of the phase current measured by the current sensor 17 or 18 has a sudden rise h1 and a dip h2. In contrast, the waveform of the corresponding phase current emphasized by each of the sine emphasizing filter and the rectangular sine filter Frs has little higher-order components.

As described above, the control apparatus 10 equipped with the controller 206 according to the sixth embodiment is configured to use the rectangular emphasizing filter unit 64 for obtaining the first Fourier coefficients for at least one phase current without using Fourier series expansion. This configuration further reduces the amount of calculations, i.e. calculation processing load, required to calculate the current vector (Id, Iq) while achieving the same advantages as those achieved in the second embodiment.

At least some of the control apparatuses 10 according to the respective first to sixth embodiments can be modified as follows.

The control apparatus 10 according to each of the first to sixth embodiments can be equipped with both the system for performing the current-feedback control described in the first embodiment and the system for performing the torque-feedback control described in the fifth embodiment.

In each of the first to sixth embodiments, the relationship between the three-phase coordinate system (U, V, W) based on the U-, V-, and W-phase windings of the stator and the d-q coordinate system of the rotor is defined as illustrated in FIG. 6A. The present disclosure is however not limited to the relationship.

Figure 6C:
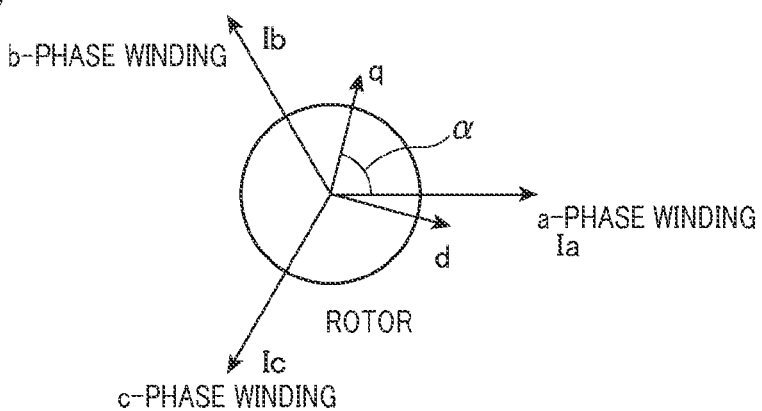
FIG. 6C is a view schematically illustrating a relationship between another set of three-phase windings of the stator of the AC motor and the d-q coordinate system of the rotor of the AC motor according to a modification of each of the first to sixth embodiments.

FIG. 6C schematically illustrates another relationship between three-phase coordinate system (a, b, c) based on a-, b-, and c-phase windings of the stator and the d-q coordinate system of the rotor.

In this modification, the equation for transforming A-, B-, and C-phase currents Ia, Ib, and Ic to the d- and q-axis Id and Iq currents is expressed as the following equation [27] (see FIG. 6C):

$$\begin{bmatrix} I_d \\ I_q \end{bmatrix} = \frac{2}{3} \begin{bmatrix} \sin\alpha & \sin\left(\alpha - \frac{2}{3}\pi\right) & \sin\left(\alpha + \frac{2}{3}\pi\right) \\ \cos\alpha & \cos\left(\alpha - \frac{2}{3}\pi\right) & \cos\left(\alpha + \frac{2}{3}\pi\right) \end{bmatrix} \begin{bmatrix} I_a \\ I_b \\ I_c \end{bmatrix} \quad [27]$$

That is the coefficient of the equation [8B] for calculating the current vector (Id, Iq) is set to $$\sqrt{\frac{2}{3}}.$$

In contrast, the coefficient of the equation [27] for calculating the current vector (Id, Iq) is set to $$\frac{2}{3}.$$

An equation for transforming the d- and q-axis Id and Iq currents to the three-phase currents Ia, Ib, and Ic is expressed as the following equation [28]:

$$\begin{bmatrix} I_a \\ I_b \\ I_c \end{bmatrix} = \frac{2}{3} \begin{bmatrix} \sin\alpha & \cos\alpha \\ \sin\left(\alpha - \frac{2}{3}\pi\right) & \cos\left(\alpha - \frac{2}{3}\pi\right) \\ \sin\left(\alpha + \frac{2}{3}\pi\right) & \cos\left(\alpha + \frac{2}{3}\pi\right) \end{bmatrix} \begin{bmatrix} I_d \\ I_q \end{bmatrix} \quad [28]$$

The equation [28] is transformed to the following equation [29] in accordance with the addition theorem of trigonometric functions:

$$\begin{bmatrix} I_a \\ I_b \\ I_c \end{bmatrix} = \frac{2}{3} \begin{bmatrix} I_d\sin\alpha - I_q\cos\alpha \\ \left(I_d\cos\frac{2}{3}\pi + I_q\sin\frac{2}{3}\pi\right)\sin\alpha - \left(I_d\sin\frac{2}{3}\pi - I_q\cos\frac{2}{3}\pi\right)\cos\alpha \\ \left(I_d\cos\frac{2}{3}\pi - I_q\sin\frac{2}{3}\pi\right)\sin\alpha + \left(I_d\sin\frac{2}{3}\pi + I_q\cos\frac{2}{3}\pi\right)\cos\alpha \end{bmatrix} \quad [29]$$

In this modification, phase-current recalculation equations for calculating the first-order components of the three-phase currents Ia, Ib, and k based on the calculated Fourier coefficients are expressed as the following equations [30]:

$$\begin{bmatrix} I_a \\ I_b \\ I_c \end{bmatrix} = \begin{bmatrix} a_a\sin\alpha + b_a\cos\alpha \\ a_b\sin\alpha + b_b\cos\alpha \\ a_c\sin\alpha + b_c\cos\alpha \end{bmatrix} \qquad [30]$$

Thus, in this modification, equations of the Fourier coefficients $a_a$ and $b_a$, $a_b$ and $b_b$, and $a_c$ and $b_c$, and equations of the current vector (Id, Iq) are derived from the relationship between the equations [29] and [30] in the same manner as the relationship between the equations [10] and [11B].

For example, for A phase, the following equation [31] is derived from the relationship between the equations [29] and [30]:

$$I_a = a_a\sin\alpha + b_a\cos\alpha = \frac{2}{3}I_d\sin\alpha - \frac{2}{3}I_q\cos\alpha \qquad [31]$$

Thus, the following equations [32.1], [32.2], [33.1], and [33.2] are obtained:

$$\begin{cases} a_a = \frac{2}{3}I_d & [32.1] \\ b_a = -\frac{2}{3}I_q & [32.2] \end{cases}$$

$$\begin{cases} I_d = \frac{3}{2}a_a & [33.1] \\ I_q = -\frac{3}{2}b_a & [33.2] \end{cases}$$

For B phase, the following equation [34] is derived from the relationship between the equations [29] and [30]:

$$I_b = a_b\sin\alpha + b_b\cos\alpha \qquad [34]$$
$$= \frac{2}{3}\left(I_d\cos\frac{2}{3}\pi + I_q\sin\frac{2}{3}\pi\right)\sin\alpha - \frac{2}{3}\left(I_d\sin\frac{2}{3}\pi - I_q\cos\frac{2}{3}\pi\right)\cos\alpha$$

Thus, the following equations [35.1], [35.2], [36.1], and [36.2] are obtained:

$$\begin{cases} a_b = \frac{2}{3}\left(I_d\cos\frac{2}{3}\pi + I_q\sin\frac{2}{3}\pi\right) = -\frac{1}{3}I_d + \frac{\sqrt{3}}{3}I_q & [35.1] \\ b_b = -\frac{2}{3}\left(I_d\sin\frac{2}{3}\pi - I_q\cos\frac{2}{3}\pi\right) = -\frac{\sqrt{3}}{3}I_d - \frac{1}{3}I_q & [35.2] \end{cases}$$

$$\begin{cases} I_d = -\frac{3}{4}a_b - \frac{3\sqrt{3}}{4}b_b & [36.1] \\ I_q = \frac{3\sqrt{3}}{4}a_b - \frac{3}{4}b_b & [36.2] \end{cases}$$

For C phase, the following equation [37] is derived from the relationship between the equations [29] and [30]:

$$I_c = a_c\sin\alpha + b_c\cos\alpha \qquad [37]$$
$$= \frac{2}{3}\left(I_d\cos\frac{2}{3}\pi - I_q\sin\frac{2}{3}\pi\right)\sin\alpha + \frac{2}{3}\left(I_d\sin\frac{2}{3}\pi + I_q\cos\frac{2}{3}\pi\right)\cos\alpha$$

Thus, the following equations [38.1], [38.2], [39.1], and [39.2] are obtained:

$$\begin{cases} a_c = \frac{2}{3}\left(I_d\cos\frac{2}{3}\pi - I_q\sin\frac{2}{3}\pi\right) = -\frac{1}{3}I_d - \frac{\sqrt{3}}{3}I_q & [38.1] \\ b_c = -\frac{2}{3}\left(I_d\sin\frac{2}{3}\pi - I_q\cos\frac{2}{3}\pi\right) = -\frac{\sqrt{3}}{3}I_d - \frac{1}{3}I_q & [38.2] \end{cases}$$

$$\begin{cases} I_d = \frac{3}{2}a_c - \frac{3}{2}b_c & [39.1] \\ I_q = -\frac{3\sqrt{3}}{4}a_c + \frac{3}{2}b_c & [39.2] \end{cases}$$

In each of the first to sixth embodiments and their modifications, the AC motor 2 is designed as a permanent magnet synchronous three-phase AC motor, but can be designed as an induction motor or another type of synchronous motor. In each of the first to sixth embodiments, the AC motor 2 is designed as a motor-generator having both a function as a motor and a function as a generator, but the AC motor 2 can be designed as a motor without having a function as a generator.

The control apparatus according to each of the first to sixth embodiments is provided with a single set of the inverter 12 and the AC motor 2, but can be provided with plural sets of the inverter 12 and the AC motor 2. The control apparatus according to each of the first to sixth embodiments can be provided with at least one inverter 12 and a plurality of AC motors 2 connected in parallel to the at least one inverter 12.

The control apparatus according to each of the first to sixth embodiments can be applied for AC motors of various types of vehicles or various types of devices.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling a three-phase AC motor, the apparatus comprising:
   an inverter to which DC power is input, the inverter comprising a plurality of switching elements connected to the AC motor;
   a current sensor member measuring at least one phase current flowing in the AC motor as a first phase current; and
   a controller configured to:
   calculate a d-axis value and a q-axis value of a current vector in a d-q coordinate system defined in the AC motor based on the measured first phase current;
   perform, based on the calculated d- and q-axis values of the current vector, at least one of a current-feedback task and a torque-feedback task,
   the current-feedback task:
   comparing the calculated d-axis value and q-axis value fed back from the AC motor with respective d-axis command current and q-axis command current,
   performing switching of the plurality of switching elements based on a result of the comparison to convert the DC power to controlled AC power, and
   applying the controlled AC power to the AC motor, thus driving the AC motor, the torque-feedback task:
estimating torque of the AC motor based on the calculated d- and q-axis values of the current vector,
comparing the estimated torque fed back from the AC motor with request torque,
performing switching of the plurality of switching elements based on a result of the comparison to convert the DC power to controlled AC power, and
applying the controlled AC power to the AC motor, thus driving the AC motor,
the controller being configured to, as the calculation of the d-axis value and the q-axis value of the current vector, perform a Fourier-coefficient obtaining task and a current-vector calculating task,
the Fourier-coefficient obtaining task being configured to:
expand one of the measured first phase current and another phase current into Fourier series of a corresponding one of the measured first phase current and the another phase current as a function of an electric rotational angle of the AC motor, the another phase current flowing the AC motor and estimated based on the measured first phase current, and
extract a first-order component from the Fourier series to thereby obtain first and second Fourier coefficients of the first-order component,
the current-vector calculating task being configured to:
multiply the first and second Fourier coefficients by each of a first pair of temporally-invariant constants and a second pair of temporally-invariant constants; and
calculate a first sum of the first and second Fourier coefficients, which have been respectively multiplied by the temporally-invariant constants of the first pair, and a second sum of the first and second Fourier coefficients, which have been respectively multiplied by the temporally-invariant constants of the second pair, to thereby obtain the d-axis value and the q-axis value of the current vector.

2. The apparatus according to claim 1, wherein:
the current sensor member comprises current sensors respectively measuring two-phase currents flowing in the AC motor as the first phase current and a second phase current;
the Fourier-coefficient obtaining task is configured to:
expand the measured first phase current flowing in the AC motor into the Fourier series of the first phase current as a function of the electric rotational angle of the AC motor
expand the measured second phase current flowing in the AC motor into second Fourier series of the first phase current as a function of the electric rotational angle of the AC motor;
extract the first-order component from the Fourier series of the first phase current to thereby obtain the first and second Fourier coefficients of the first-order component for the first phase current; and
extract a second first-order component from the second Fourier series of the second phase current to thereby obtain first and second Fourier coefficients of the first-order component for the second phase current; and
the controller is configured to:
perform the current-vector calculating task using the first and second Fourier coefficients of the first-order component for each of the first and second phase currents, thus calculating:
a first d-axis value and a first q-axis value for the first phase current as a first candidate set of the d- and q-axis values of the current vector; and a second d-axis value and a second q-axis value for the third phase current as a second candidate set of the d- and q-axis values of the current vector; and
calculate an average of the first d-axis value of the first candidate set and the second d-axis value of the second candidate set to calculate the d-axis value of the current vector, and an average of the first q-axis value of the first candidate set and the second q-axis value of the second candidate set to calculate the q-axis value of the current vector.

3. The apparatus according to claim 1, wherein:
the current sensor member comprises current sensors respectively measuring two-phase currents as the first phase current and a second phase current flowing in the AC motor;
the controller is configured to estimate, as the another phase current, a remaining third phase current based of the measured first and second phase currents and Kirchhoff's law;
the Fourier-coefficient obtaining task is configured to:
expand the estimated third phase current flowing the AC motor into the Fourier series of the estimated third phase current as a function of the electric rotational angle of the AC motor, and
extract the first-order component from the Fourier series to thereby obtain the first and second Fourier coefficients of the first-order component; and
the controller is configured to perform the current-vector calculating task using the first and second Fourier coefficients of the first-order component for the third phase currents, thus obtaining the d-axis value and the q-axis value of the current vector.

4. The apparatus according to claim 1, further comprising:
a current obtaining unit configured to obtain a second phase current flowing in the AC motor based on one of measurement of the second phase current from the AC motor and estimation of the second phase current based on the measured first phase current;
a three-phase to two-phase converter configured to convert the first phase current and the second phase current into to a second d-axis value and a second q-axis value of a second current vector; and
a selector configured to select one of d- and q-axis values of the current vector obtained by the current-vector calculating task; and the second d- and q-axis values of the second current vector according to at least one of a rotational speed of the AC motor, a request torque for the AC motor, and a modulation factor of the inverter.

5. The apparatus according to claim 1, wherein:
the current-vector calculating task is configured to calculate the temporally-invariant constants of each of the first pair and the second pair based on an assumption that coefficients of sine and cosine functions included in a phase-current recalculation equation are equal to coefficients of sine and cosine functions included in a two-phase to three-phase conversion equation,
the phase-current recalculation equation calculating the first phase current based on the Fourier-coefficients of the first-order components of the first phase current,
the two-phase to three-phase conversion equation converting B- and q-axis currents to three-phase currents flowing in the AC motor.

6. The apparatus according to claim 2, wherein:
the current-vector calculating task is configured to calculate the temporally-invariant constants of each of the first pair and the second pair based on an assumption that coefficients of sine and cosine functions included in a phase-current recalculation equation are equal to coefficients of sine and cosine functions included in a two-phase to three-phase conversion equation, the phase-current recalculation equation calculating the first phase current based on the Fourier-coefficients of the first-order components of the first phase current, the two-phase to three-phase conversion equation converting d- and q-axis currents to three-phase currents flowing in the AC motor.

7. The apparatus according to claim 3, wherein:

the current-vector calculating task is configured to calculate the temporally-invariant constants of each of the first pair and the second pair based on an assumption that coefficients of sine and cosine functions included in a phase-current recalculation equation are equal to coefficients of sine and cosine functions included in a two-phase to three-phase conversion equation, the phase-current recalculation equation calculating the first phase current based on the Fourier-coefficients of the first-order components of the first phase current, the two-phase to three-phase conversion equation converting B- and q-axis currents to three-phase currents flowing in the AC motor.

8. The apparatus according to claim 4, wherein:

the current-vector calculating task is configured to calculate the temporally-invariant constants of each of the first pair and the second pair based on an assumption that coefficients of sine and cosine functions included in a phase-current recalculation equation are equal to coefficients of sine and cosine functions included in a two-phase to three-phase conversion equation, the phase-current recalculation equation calculating the first phase current based on the Fourier-coefficients of the first-order components of the first phase current, the two-phase to three-phase conversion equation converting B- and q-axis currents to three-phase currents flowing in the AC motor.

9. An apparatus for controlling a three-phase AC motor, the apparatus comprising:

an inverter to which DC power is input, the inverter comprising a plurality of switching elements connected to the AC motor;

a current sensor member measuring at least one phase current flowing in the AC motor as a first phase current; and a controller configured to:

calculate a d-axis value and a q-axis value of a current vector in a d-q coordinate system defined in the AC motor based on the measured first phase current;

perform, based on the calculated d- and q-axis values of the current vector, at least one of a current-feedback task and a torque-feedback task, the current-feedback task:

comparing the calculated d-axis value and q-axis value fed back from the AC motor with respective d-axis command current and q-axis command current, performing on- and off operations of the plurality of switching elements based on a result of the comparison to convert the DC power to controlled AC power, and applying the controlled AC power to the AC motor, thus driving the AC motor, the torque-feedback task:

estimating torque of the AC motor based on the calculated d- and q-axis values of the current vector, comparing the estimated torque fed back from the AC motor with request torque, performing on- and off operations of the plurality of switching elements based on a result of the comparison to convert the DC power to controlled AC power, and applying the controlled AC power to the AC motor, thus driving the AC motor, the controller being configured to, as the calculation of the d-axis value and the q-axis value of the current vector, perform a filtering task and a current-vector calculating task, the filtering task being configured to:

filter one of the measured first phase current and another phase current to emphasize a first-order component of a corresponding one of the measured first phase current and the another phase current, thus obtaining first and second coefficients of the first-order component, the current-vector calculating task being configured to:

multiply the first and second coefficients by each of a first pair of temporally-invariant constants and a second pair of temporally-invariant constants; and calculate a first sum of the first and second coefficients, which haven been respectively multiplied by the temporally-invariant constants of the first pair, and a second sum of the first and second coefficients, which have been multiplied by the temporally-invariant constants of the second pair, to thereby obtain the d-axis value and the q-axis value of the current vector.

10. The apparatus according to claim 9, wherein:

the current-vector calculating task is configured to calculate the temporally-invariant constants of each of the first pair and the second pair based on an assumption that coefficients of sine and cosine functions included in a phase-current recalculation equation are equal to coefficients of sine and cosine functions included in a two-phase to three-phase conversion equation, the phase-current recalculation equation calculating the first phase current based on the Fourier-coefficients of the first-order components of the first phase current, the two-phase to three-phase conversion equation converting d- and q-axis currents to three-phase currents flowing in the AC motor.

* * * * *